(12) United States Patent
Windebank et al.

(10) Patent No.: US 11,001,644 B2
(45) Date of Patent: *May 11, 2021

(54) RE-DISPERSED MICROFIBRILLATED CELLULOSE

(71) Applicant: FiberLean Technologies Limited, Par (GB)

(72) Inventors: Mark Windebank, Par (GB); David Skuse, Truro (GB); Madeleine Adams, Chandlers Ford (GB); Guillaume Tellier, Brussels (BE)

(73) Assignee: FIBERLEAN TECHNOLOGIES LIMITED, Cornwell (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,370

(22) Filed: Aug. 27, 2019

(65) Prior Publication Data
US 2019/0382510 A1    Dec. 19, 2019

Related U.S. Application Data

(63) Continuation of application No. 15/493,769, filed on Apr. 21, 2017, now Pat. No. 10,435,482.

(30) Foreign Application Priority Data

Apr. 22, 2016   (GB) .................................... 1607076

(51) Int. Cl.
| | |
|---|---|
| *D21H 17/26* | (2006.01) |
| *C08B 16/00* | (2006.01) |
| *D21H 17/25* | (2006.01) |
| *D21H 17/69* | (2006.01) |
| *D21H 19/10* | (2006.01) |
| *D21H 19/38* | (2006.01) |
| *D21C 9/00* | (2006.01) |
| *D21C 9/18* | (2006.01) |
| *D21F 3/00* | (2006.01) |
| *D21H 11/18* | (2006.01) |

(52) U.S. Cl.
CPC .............. *C08B 16/00* (2013.01); *D21C 9/007* (2013.01); *D21C 9/18* (2013.01); *D21F 3/00* (2013.01); *D21H 11/18* (2013.01); *D21H 17/25* (2013.01); *D21H 17/69* (2013.01); *D21H 19/10* (2013.01); *D21H 19/385* (2013.01)

(58) Field of Classification Search
USPC ........................................................ 162/157
See application file for complete search history.

(56) References Cited

U.S. PATENT DOCUMENTS

| 4,481,076 A | 11/1984 | Herrick |
| 5,576,617 A | 11/1996 | Webb et al. |
| 8,231,764 B2 | 7/2012 | Husband et al. |
| 8,871,056 B2 | 10/2014 | Gane et al. |
| 10,435,482 B2 * | 10/2019 | Windebank ............. C08B 16/00 |
| 2013/0280545 A1 | 10/2013 | Husband et al. |
| 2015/0064491 A1 | 3/2015 | Phipps et al. |
| 2016/0024718 A1 | 1/2016 | Lee et al. |
| 2017/0145635 A1 | 5/2017 | Motsi et al. |

FOREIGN PATENT DOCUMENTS

| CN | 102753752 A | 10/2012 |
| EP | 0614948 A1 | 8/1999 |
| EP | 1553103 A1 | 7/2005 |
| EP | 2653508 A1 | 10/2013 |
| EP | 2917402 A1 | 9/2015 |
| JP | S60-186548 A | 9/1985 |
| JP | 2014-503696 A | 2/2014 |
| JP | 2015-516515 A | 6/2015 |
| JP | 2016-503465 A | 2/2016 |
| JP | 2016-511772 A | 4/2016 |
| JP | 2016-186018 A | 10/2016 |
| WO | 2010/131016 A2 | 11/2010 |
| WO | 2014/072913 A1 | 5/2014 |
| WO | 2014/091212 A1 | 6/2014 |
| WO | 2014/140275 A1 | 9/2014 |
| WO | 2014 140275 A1 | 9/2014 |
| WO | 2015/173376 A1 | 11/2015 |
| WO | 2015 173376 A1 | 11/2015 |

OTHER PUBLICATIONS

Australian Notice of Acceptance for Patent Application dated Dec. 10, 2019 for Australian Patent Application No. 2017252024 (3 pages).
Extended European Search Report dated Apr. 24, 2020 for European Patent Application No. 20164188.3 (9 pages).
Korean Office Action (translation) dated Feb. 11, 2019 for Korean Patent Application No. 10-2018-7029890 (8 pages).
Unexamined Patent application Publication No. 2016-505727 (Feb. 25, 2016) (27 pages).
International Search Report and Written Opinion for International application No. PCT/IB2017/000609 dated Sep. 5, 2017 (8 pages).
Japanese Office Action for Japanese Application No. 2018-549577 dated Apr. 23, 2019 (6 pages).
Chinese Office Action dated Oct. 13, 2020 for Chinese Patent Application No. 201780025026.3 (16 pages).

* cited by examiner

*Primary Examiner* — Mark Halpern
(74) *Attorney, Agent, or Firm* — Raymond G. Arner; Pierce Atwood LLP

(57) ABSTRACT

Methods of improving the re-dispersibility of dried or at least partially dried microfibrillated cellulose, methods of re-dispersing dried or at least partially dried microfibrillated cellulose, compositions comprising re-dispersed microfibrillated cellulose and the use of re-dispersed microfibrillated cellulose in an article, product or composition; and methods of improving the physical and/or mechanical properties of re-dispersed dried or partially dried microfibrillated cellulose.

27 Claims, 1 Drawing Sheet

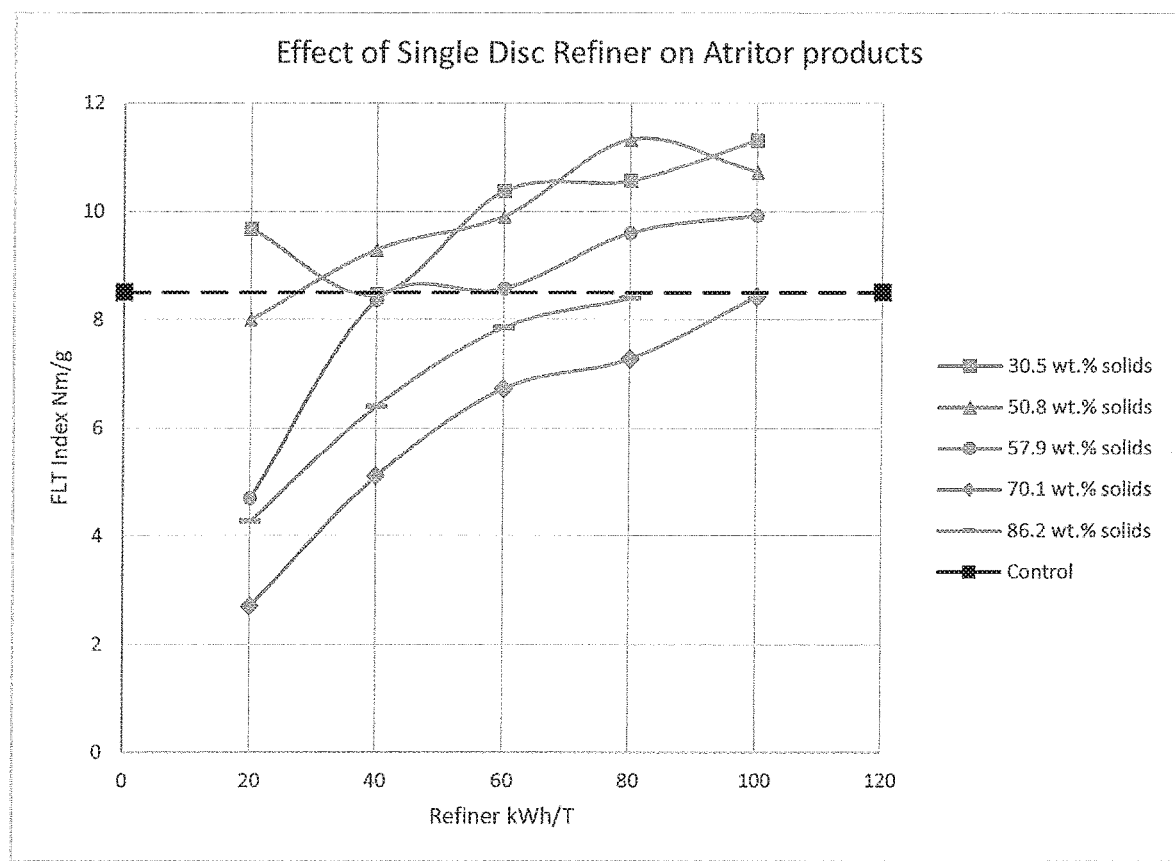

RE-DISPERSED MICROFIBRILLATED CELLULOSE

CROSS REFERENCE TO RELATED APPLICATIONS

This application is a continuation of U.S. Application Ser. No. 15/493,769, filed Apr. 21, 2017, which claims the benefit of United Kingdom Patent Application No. 1607076.5, filed Apr. 22, 2016, the entire contents of which is incorporated herein by reference.

TECHNICAL FIELD

The present invention relates generally to methods of improving the re-dispersibility of dried or at least partially dried microfibrillated cellulose and methods of re-dispersing dried or at least partially dried microfibrillated cellulose. The methods may, for example, comprise dewatering the aqueous composition, optionally followed by drying. The re-dispersing microfibrillated cellulose may, for example, comprise re-dispersing dried or at least partially dried microfibrillated cellulose in a liquid medium and in the presence of an additive other than inorganic particulate material and/or in the presence of a combination of inorganic particulate materials. The additive and/or combination of inorganic particulate materials may, for example, enhance a mechanical and/or physical property of the re-dispersed microfibrillated cellulose. The present invention further relates to compositions comprising re-dispersed microfibrillated cellulose and the use of re-dispersed microfibrillated cellulose in an article, product or composition.

BACKGROUND OF THE INVENTION

In recent years microfibrillated cellulose and compositions comprising same has been shown to have a variety of useful properties, including the enhancement of the mechanical, physical and/or optical properties of a variety of products, such as paper, paperboard, polymeric articles, paints, and the like. Typically prepared in aqueous form, it is normally dried for transport in order to reduce its weight and associated transportation costs. The end-user will then typically re-disperse the microfibrillated cellulose prior to use in the intend end-use. However, following drying and re-dispersion some or all of its advantageous properties are diminished or lost. Thus, there is an ongoing need to improve the properties of microfibrillated cellulose following drying and re-dispersal.

SUMMARY OF THE INVENTION

In accordance with a first aspect of the present invention there is provided a method of improving the re-dispersibility of dried or at least partially dried microfibrillated cellulose, comprising drying or at least partially drying an aqueous composition of microfibrillated cellulose by a method comprising:

(i) dewatering the aqueous composition by one or more of:
(a) dewatering by belt press, for example, high pressure automated belt press, (b) dewatering by centrifuge, (c) dewatering by tube press, (d) dewatering by screw press, and (e) dewatering by rotary press; followed by drying, or (ii) dewatering the aqueous composition, followed by drying by one or more of:
(f) drying in a fluidized bed dryer, (g) drying by microwave and/or radio frequency dryer, (h) drying in a hot air swept mill or dryer, for example, a cell mill or an atritor mill, and (i) drying by freeze drying;

or (iii) any combination of dewatering according to (i) and drying according to (ii), or (iv) a combination of dewatering and drying the aqueous composition, where upon re-dispersing the dried or at least partially dried microfibrillated cellulose in a liquid medium, the re-dispersed microfibrillated cellulose has a mechanical and/or physical property which is closer to that of the microfibrillated cellulose prior to drying or at least partial drying than it would have been but for drying according to (i), (ii), (iii) or (iv), optionally wherein the dried or at least partially dried microfibrillated cellulose comprises inorganic particulate material and/or an additive, the presence of which enhances a mechanical and/or physical property of the re-dispersed microfibrillated cellulose.

In certain embodiments, the method further comprises re-dispersing the dried or at least partially dried microfibrillated cellulose in the liquid medium, and optionally further comprising using the re-dispersed microfibrillated cellulose in the manufacture of an article, product or composition.

In accordance with a second aspect of the present invention there is provided a method of re-dispersing microfibrillated cellulose, the method comprising re-dispersing dried or at least partially dried microfibrillated cellulose in a liquid medium, wherein the dried or at least partially dried microfibrillated cellulose was prepared by dewatering and drying an aqueous composition comprising microfibrillated cellulose whereby the re-dispersed microfibrillated cellulose has a mechanical and/or physical property which is closer to that of the microfibrillated cellulose prior to drying or at least partial drying than it would have been but for said dewatering and drying, optionally wherein the dried or at least partially dried microfibrillated cellulose comprises: (i) inorganic particulate material, (ii) a combination of inorganic particulate materials, and/or (iii) an additive other than inorganic particulate material, the presence of which during re-dispersing enhances a mechanical and/or physical property of the re-dispersed microfibrillated cellulose; and wherein dewatering is selected from one or more of:

(a) dewatering by belt press, for example, high pressure automated belt press;
(b) dewatering by centrifuge;
(c) dewatering by tube press;
(d) dewatering by screw press; and
(e) dewatering by rotary press;

and/or wherein drying is selected from one or more of:
(f) drying in a fluidized bed dryer;
(g) drying by microwave and/or radio frequency dryer
(h) drying in a hot air swept mill or dryer, for example, a cell mill or an atritor mill; and
(i) drying by freeze drying.

In accordance with a third aspect of the present invention there is provided a method of improving the physical and/or mechanical properties of re-dispersed dried or partially dried microfibrillated cellulose, the method comprising:

a. providing: an aqueous composition of microfibrillated cellulose;
b. dewatering the aqueous composition by one or more of: (i) dewatering by belt press, (ii) a high pressure automated belt press, (iii) centrifuge, (iv) tube press, (v) screw press, and (vi) rotary press;

to produce a dewatered microfibrillated cellulose composition;

c. drying the dewatered microfibrillated cellulose composition by one or more of: (i) a fluidized bed dryer, (ii) microwave and/or radio frequency dryer, (iii) a hot air swept mill or dryer, a cell mill or a multirotor cell mill, and (iv) freeze drying;

to produce a dried or partially dried microfibrillated cellulose composition;

whereupon re-dispersing the dried or partially dried microfibrillated cellulose composition into a liquid medium, the microfibrillated cellulose has a tensile index and/or viscosity which is at least 50% of the tensile index and/or viscosity of the aqueous composition of microfibrillated cellulose prior to drying at a comparable concentration and a fibre steepness of from 20 to 50.

In accordance with a forth aspect of the present invention there is provided a method of re-dispersing microfibrillated cellulose, the method comprising re-dispersing dried or at least partially dried microfibrillated cellulose in a liquid medium and in the presence of an additive other than inorganic particulate material which enhances a mechanical and/or physical property of the re-dispersed microfibrillated cellulose, wherein the microfibrillated cellulose prior to being dried or at least partially dried has a fibre steepness of from 20 to 50.

In accordance with a fifth aspect of the present invention there is provided a method of re-dispersing microfibrillated cellulose, the method comprising re-dispersing dried or at least partially dried microfibrillated cellulose in a liquid medium and in the presence of a combination of inorganic particulate materials, wherein the combination of inorganic particulate materials enhances a mechanical and/or physical property of the re-dispersed microfibrillated cellulose, optionally wherein the combination of inorganic particulate materials comprises calcium carbonate and a platy mineral.

In accordance with a sixth aspect of the present invention there is provided a composition comprising re-dispersed microfibrillated cellulose dispersed in a liquid medium and which is obtainable/obtained by a method according to any aspect or embodiment of the present invention, and having, at a comparable concentration, a tensile index and/or viscosity which is at least 50% of the tensile index and/or viscosity of the aqueous composition of microfibrillated cellulose prior to drying, wherein either (i) the microfibrillated cellulose of the aqueous composition has a fibre steepness of from 20 to 50, and/or (ii) the aqueous composition of microfibrillated cellulose comprises inorganic particulate material.

In accordance with a seventh aspect of the present invention there is provided use of re-dispersed microfibrillated cellulose according to any aspect or embodiment of the present invention. In certain embodiments, the microfibrillated cellulose is used in an article, product or composition. Thus, in accordance with a further aspect of the present invention there is provided an article, product or composition comprising a microfibrillated cellulose according to any aspect or embodiment of the present invention.

The details, examples and preferences provided in relation to any particular one or more of the stated aspects of the present invention apply equally to all aspects of the present invention. Any combination of the embodiments, examples and preferences described herein in all possible variations thereof is encompassed by the present invention unless otherwise indicated herein, or otherwise clearly contradicted by context.

BRIEF DESCRIPTION OF THE FIGURES

FIG. 1 shows a summary of the effect of the use of a single disc refiner on dried composition comprising microfibrillated cellulose and calcium carbonate materials.

DETAILED DESCRIPTION OF THE INVENTION

Seeking to improve one or more properties of re-dispersed microfibrillated cellulose and compositions comprising same, it has surprisingly been found that a combination of dewatering and drying, for example, mechanical dewatering and drying, an (never before dried) aqueous composition comprising microfibrillated cellulose, optionally in the presence of an inorganic particulate and/or other additive as herein described, can be implemented in order to enhance or improve one or more properties of the microfibrillated cellulose upon re-dispersal. That is to say, compared to the microfibrillated cellulose prior to drying, the one or more properties of the re-dispersed microfibrillated are closer to the one or properties of the microfibrillated cellulose prior to drying than it/they would have been but for the combination of dewatering and drying. Similarly, it has surprisingly been found that the incorporation of inorganic particulate material, or a combination of inorganic particulate materials, and/or other additives as herein described, can enhance the re-dispersibility of the microfibrillated cellulose following initial drying.

Thus, in certain embodiments, the method of improving the re-dispersibility of dried or at least partially dried microfibrillated cellulose comprises drying or at least partially drying an aqueous composition by a method comprising:

(i) dewatering the aqueous composition by one or more of:
(a) dewatering by belt press, for example, high pressure automated belt press, (b) dewatering by centrifuge, (c) dewatering by tube press, (d) dewatering by screw press, and (e) dewatering by rotary press; followed by drying, or (ii) dewatering the aqueous composition, followed by drying by one or more of:
(f) drying in a fluidized bed dryer, (g) drying by microwave and/or radio frequency dryer, (h) drying in a hot air swept mill or dryer, for example, a cell mill or an atritor mill, and (i) drying by freeze drying;

or (iii) any combination of dewatering according to (i) and drying according to (ii), or (iv) a combination of dewatering and drying the aqueous composition.

In certain embodiments, if drying is by freeze drying, dewatering comprises one or more of (a) to (e).

Upon subsequent re-dispersal, e.g., following transportation to another facility, of the dried or at least partially dried microfibrillated cellulose in a liquid medium, the re-dispersed microfibrillated cellulose has a mechanical and/or physical property which is closer to that of the microfibrillated cellulose prior to drying or at least partial drying than it would have been but for drying according to (i), (ii), (iii) or (iv).

Thus, in accordance with another aspect, there is provided a method of re-dispersing microfibrillated cellulose, the method comprising re-dispersing dried or at least partially dried microfibrillated cellulose in a liquid medium, wherein the dried or at least partially dried microfibrillated cellulose was prepared by dewatering and drying an aqueous composition comprising microfibrillated cellulose whereby the re-dispersed microfibrillated cellulose has a mechanical and/or physical property which is closer to that of the microfibrillated cellulose prior to drying or at least partial drying than it would have been but for said dewatering and drying, optionally wherein the dried or at least partially dried microfibrillated cellulose comprises: (i) inorganic particulate material, (ii) a combination of inorganic particulate materials, and/or (iii) an additive other than inorganic particulate material, the presence of which during re-dispersing enhances a mechanical and/or physical property of the re-dispersed microfibrillated cellulose; and optionally wherein dewatering is selected from one or more of:
 (a) dewatering by belt press, for example, high pressure automated belt press;
 (b) dewatering by centrifuge;
 (c) dewatering by tube press;
 (d) dewatering by screw press; and
 (e) dewatering by rotary press;
and/or wherein drying is selected from one or more of:
 (f) drying in a fluidized bed dryer;
 (g) drying by microwave and/or radio frequency dryer
 (h) drying in a hot air swept mill or dryer, for example, a cell mill or an atritor mill;
and
 (i) drying by freeze drying;

In certain embodiments, if drying was by freeze drying, dewatering comprises one or more of (a) to (e).

Thus, in accordance with another aspect, there is provided a method of improving the physical and/or mechanical properties of re-dispersed dried or partially dried microfibrillated cellulose, the method comprising:
 a. providing: an aqueous composition of microfibrillated cellulose;
 b. dewatering the aqueous composition by one or more of:
   (i) dewatering by belt press, (ii) a high pressure automated belt press, (iii) centrifuge, (iv) tube press, (v) screw press, and (vi) rotary press;
to produce a dewatered microfibrillated cellulose composition;
 c. drying the dewatered microfibrillated cellulose composition by one or more of: (i) a fluidized bed dryer, (ii) microwave and/or radio frequency dryer, (iii) a hot air swept mill or dryer, a cell mill or a multirotor cell mill, and (iv) freeze drying;
to produce a dried or partially dried microfibrillated cellulose composition;
whereupon re-dispersing the dried or partially dried microfibrillated cellulose composition into a liquid medium, the microfibrillated cellulose has a tensile index and/or viscosity which is at least 50% of the tensile index and/or viscosity of the aqueous composition of microfibrillated cellulose prior to drying at a comparable concentration and a fibre steepness of from 20 to 50.

The following sections pertain to any of the aspects described above.

References to "dried" or "drying" includes "at least partially dried" or "or at least partially drying".

In certain embodiments, the aqueous composition comprising microfibrillated cellulose is dewatered by belt press, for example, high pressure automated belt press, followed by drying, for example, via one or more of (f) to (i) above.

In certain embodiments, the aqueous composition comprising microfibrillated cellulose is dewatered by centrifuge, followed by drying, for example, via one or more of (f) to (i) above.

In certain embodiments, the aqueous composition comprising microfibrillated cellulose is dewatered by tube press, followed by drying, for example, via one or more of (f) to (i) above.

In certain embodiments, the aqueous composition comprising microfibrillated cellulose is dewatered by screw press, followed by drying, for example, via one or more of (f) to (i) above.

In certain embodiments, the aqueous composition comprising microfibrillated cellulose is dewatered by rotary press, followed by drying, for example, via one or more of (f) to (i) above.

In certain embodiments, the aqueous composition is dewatered, for example, via one or more of (a) to (e) above, and then dried in a fluidized bed dryer.

In certain embodiments, the aqueous composition is dewatered, for example, via one or more of (a) to (e) above, and then dried by microwave and/or by radio frequency drying.

In certain embodiments, the aqueous composition is dewatered, for example, via one or more of (a) to (e) above, and then dried in a hot air swept mill or dryer, for example, a cell mil or an Atritor mill. An Atritor mill may be an Atritor dryer-pulveriser, an Attritor Cell Mill, an Atritor Extended classifier mill or an Atritor Air Swept Tubular (AST) dryer (Atritor Limited, 12 The Stampings, Blue Ribbon Park, Coventry, West Midlands, England). Such mills may be used to prepare the aqueous composition of microfibrillated cellulose which is subsequently dried and then re-dispersed.

In certain embodiments, the aqueous composition is dewatered, for example, via one or more of (a) to (e) above, and then dried by freeze drying. In certain embodiments, dewatering is by one or more of (a)-(e) described above.

Dewatering and drying may be carried out for any suitable period of time, for example, from about 30 minutes to about 12 hours, or from about 30 minutes to about 8 hours, or from about 30 minutes to about 4 hours, or from about 30 minutes to about 2 hours. The period of time will be depend on factors such as for example, the solids content of the aqueous composition comprising microfibrillated cellulose, the bulk amount of the aqueous composition comprising microfibrillated cellulose and the temperature of drying.

In certain embodiments, drying is conducted at a temperature of from about 50° C. to about 120° C., for example, from about 60° C. to about 100° C., or at least about 70° C., or at least about 75° C., or at least about 80° C.

In certain embodiments, the method further comprises re-dispersing the dried or at least partially dried microfibrillated cellulose in a liquid medium, which may be aqueous or non-aqueous liquid. In certain embodiments, the liquid medium is an aqueous liquid, for example, water. In certain embodiments, the water is a waste water or a recycled waste water derived from the manufacturing plant in which the re-dispersed microfibrillated cellulose is being used to manufacture an article, product or composition. For example, in paper/paper board manufacturing plants, the water may be or comprise recycled white water from the paper making process. In certain embodiments, at least portion of any inorganic particulate material and/or additive other than inorganic particulate material be present in the recycle white water.

In certain embodiments, the method further comprises using the re-dispersed microfibrillated cellulose in the manufacture of an article, product or composition, which are many and various and include, without limitation, paper and paperboard, polymeric articles, products and compositions, and other compositions such as coatings, e.g., paint.

In certain embodiments the dried or at least partially dried microfibrillated cellulose comprises inorganic particulate material and/or an additive, the presence of which enhances a mechanical and/or physical property of the re-dispersed microfibrillated cellulose. Such inorganic particulate materials and additives are described herein in below.

The aqueous composition comprising microfibrillated cellulose may be dewatered and dried in order to reduce water content by at least 10% by weight, based on the total weight of the aqueous composition comprising microfibrillated cellulose prior to dewatering and drying, for example, by at least 20% by weight, or by at least 30% by weight, or by at least 40% by weight, or by at least about 50% by weight, or by at least 60% by weight, or by at least 70% by weight, or by at least 80% by weight, or by at least 80% by weight, or by at least 90 by weight, or by at least about 95% by weight, or by at least about 99% by weight, or by at least about 99.5% by weight, or by at least 99.9% by weight.

By "dried" or "dry" is meant that the water content of the aqueous composition comprising microfibrillated cellulose is reduced by at least 95% by weight.

By 'partially dried' or "partially dry" is meant that the water content of the aqueous composition comprising microfibrillated cellulose is reduced by an amount less than 95% by weight. In certain embodiments, "partially dried" or "partially dry" means that the water content of the aqueous composition comprising microfibrillated cellulose is reduced by at least 50% by weight, for example, by at least 75% by weight, or by at least 90% by weight.

The aqueous composition comprises microfibrillated cellulose. By "microfibrillated cellulose" is meant a cellulose composition in which microfibrils of cellulose are liberated or partially liberated as individual species or as smaller aggregates as compared to the fibres of a pre-microfibrillated cellulose. The microfibrillated cellulose may be obtained by microfibrillating cellulose, including but not limited to the processes described herein. Typical cellulose fibres (i.e., pre-microfibrillated pulp) suitable for use include larger aggregates of hundreds or thousands of individual cellulose microfibrils. By microfibrillating the cellulose, particular characteristics and properties, including but not limited to the characteristic and properties described herein, are imparted to the microfibrillated cellulose and the compositions including the microfibrillated cellulose.

The microfibrillated cellulose may be derived from any suitable source, as described herein.

Unless otherwise stated, particle size properties referred to herein for the inorganic particulate materials are as measured in a well-known manner by sedimentation of the particulate material in a fully dispersed condition in an aqueous medium using a Sedigraph 5100 machine as supplied by Micromeritics Instruments Corporation, Norcross, Ga., USA (telephone: +1 770 662 3620; web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value.

Alternatively, where stated, the particle size properties referred to herein for the inorganic particulate materials are as measured by the well-known conventional method employed in the art of laser light scattering, using a Malvern Mastersizer S machine as supplied by Malvern Instruments Ltd (or by other methods which give essentially the same result). In the laser light scattering technique, the size of particles in powders, suspensions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value.

Unless otherwise stated, particle size properties of the microfibrillated cellulose materials are as measured by the well-known conventional method employed in the art of laser light scattering, using a Malvern Mastersizer S machine as supplied by Malvern Instruments Ltd (or by other methods which give essentially the same result).

In certain embodiments, the microfibrillated cellulose has a $d_{50}$ ranging from about 5 to μm about 500 μm, as measured by laser light scattering. In certain embodiments, the microfibrillated cellulose has a $d_{50}$ of equal to or less than about 400 μm, for example equal to or less than about 300 μm, or equal to or less than about 200 μm, or equal to or less than about 150 μm, or equal to or less than about 125 μm, or equal to or less than about 100 μm, or equal to or less than about 90 μm, or equal to or less than about 80 μm, or equal to or less than about 70 μm, or equal to or less than about 60 μm, or equal to or less than about 50 μm, or equal to or less than about 40 μm, or equal to or less than about 30 μm, or equal to or less than about 20 μm, or equal to or less than about 10 μm.

In certain embodiments, the microfibrillated cellulose has a modal fibre particle size ranging from about 0.1-500 μm. In certain embodiments, the microfibrillated cellulose has a modal fibre particle size of at least about 0.5 μm, for example at least about 10 μm, or at least about 50 μm, or at least about 100 μm, or at least about 150 μm, or at least about 200 μm, or at least about 300 μm, or at least about 400 μm.

Additionally or alternatively, the microfibrillated cellulose may have a fibre steepness equal to or greater than about 10, as measured by Malvern. Fibre steepness (i.e., the steepness of the particle size distribution of the fibres) is determined by the following formula:

$$\text{Steepness} = 100 \times (d_{30}/d_{70})$$

The microfibrillated cellulose may have a fibre steepness equal to or less than about 100. The microfibrillated cellulose may have a fibre steepness equal to or less than about 75, or equal to or less than about 50, or equal to or less than about 40, or equal to or less than about 30. The microfibrillated cellulose may have a fibre steepness from about 20 to about 50, or from about 25 to about 40, or from about 25 to about 35, or from about 30 to about 40.

The microfibrillated cellulose may, for example, be treated prior to dewatering and/or drying. For example, one or more additives as specified below (e.g. salt, sugar, glycol, urea, glycol, carboxymethyl cellulose, guar gum, or a combination thereof as specified below) may be added to the microfibrillated cellulose. For example, one or more oligomers (e.g. with or without the additives specified above) may be added to the microfibrillated cellulose. For example, one or more inorganic particulate materials may be added to the microfibrillated cellulose to improve dispersibility (e.g. talc or minerals having a hydrophobic surface-treatment such as a stearic acid surface-treatment (e.g. stearic acid treated calcium carbonate). The additives may, for example, be suspended in low dielectric solvents. The microfibrillated cellulose may, for example, be in an emulsion, for example an oil/water emulsion, prior to dewatering and/or drying. The microfibrillated cellulose may, for example, be in a masterbatch composition, for example a polymer masterbatch composition and/or a high solids masterbatch composition, prior to dewatering and/or drying. The microfibrillated cellulose may, for example, be a high solids composition (e.g. solids content equal to or greater than about 60 wt % or equal to or greater than about 70 wt % or equal to or greater than about 80 wt % or equal to or greater than about 90 wt % or equal to or greater than about 95 wt % or equal to or greater than about 98 wt % or equal to or greater than about 99 wt %) prior to dewatering and/or drying. Any combination of one or more of the treatments may additionally or alternatively be applicable to the microfibrillated cellulose after dewatering and drying but prior to or during re-dispersion.

The re-dispersed microfibrillated cellulose has a mechanical and/or physical property which is closer to that of the microfibrillated cellulose prior to drying or at least partial drying than it would have been but for drying in accordance with (i), (ii), (iii) or (iv) above.

In certain embodiments, the re-dispersed microfibrillated cellulose has a mechanical and/or physical property which is closer to that of the microfibrillated cellulose prior to drying or at least partial drying than it would have been but for drying in accordance with (i), (ii) or (iii).

The mechanical property may be any determinable mechanical property associated with microfibrillated cellulose. For example, the mechanical property may be a strength property, for example, tensile index. Tensile index may be measured using a tensile tester. Any suitable method and apparatus may be used provided it is controlled in order to compare the tensile index of the microfibrillated cellulose before drying and after re-dispersal. For example, the comparison should be conducted at equal concentrations of microfibrillated cellulose, and any other additive or inorganic particulate material(s) which may be present. Tensile index may be expressed in any suitable units such as, for example, N·m/g or kN·m/kg.

The physical property may be any determinable physical property associated with microfibrillated cellulose. For example, the physical property may be viscosity. Viscosity may be measured using a viscometer. Any suitable method and apparatus may be used provided it is controlled in order to compare the viscosity of the microfibrillated cellulose prior to drying and after re-dispersal. For example, the comparison should be conducted at equal concentrations of microfibrillated cellulose, and any other additive or inorganic particulate material(s) which may be present. In certain embodiments, the viscosity is Brookfield viscosity, with units of mPa·s.

In certain embodiments, the tensile index and/or viscosity of the re-dispersed microfibrillated cellulose is at least about 25% of the tensile index and/or viscosity of the aqueous composition of microfibrillated cellulose prior to drying, for example, at least about 30%, or at least about 35%, or at least about 40%, or at least 45%, or at least about 50%, or at least about 55%, or at least about 60%, or at least about 65%, or at least about 70%, or at least about 75%, or at least about 80% of the tensile index and/or viscosity of the microfibrillated cellulose prior to drying.

For example, if the tensile index of the microfibrillated cellulose prior to drying was 8 N·m/g, then a tensile index of at least 50% of this value would be 4 N·m/g.

In certain embodiments, the tensile index of the re-dispersed microfibrillated cellulose is at least about 25% of the tensile index of the aqueous composition of microfibrillated cellulose prior to drying, for example, at least about 30%, or at least about 35%, or at least about 40%, or at least 45%, or at least about 50%, or at least about 55%, or at least about 60%, or at least about 65%, or at least about 70%, or at least about 75%, or at least about 80% of the tensile index of the microfibrillated cellulose prior to drying.

In certain embodiments, the viscosity of the re-dispersed microfibrillated cellulose is at least about 25% of the viscosity of the aqueous composition of microfibrillated cellulose prior to drying, for example, at least about 30%, or at least about 35%, or at least about 40%, or at least about 45%, or at least about 50%, or at least about 55%, or at least about 60%, or at least about 65%, or at least about 70%, or at least about 75%, or at least about 80% of the viscosity of the microfibrillated cellulose prior to drying.

In certain embodiments, inorganic particulate material and/or an additive other than inorganic particulate material is present during the dewatering and drying. The inorganic particulate material and/or additive may be added at any stage prior to dewatering and drying. For example, the inorganic particulate material and/or additive may be added during manufacture of the aqueous composition comprising microfibrillated cellulose, following manufacture of the aqueous composition comprising microfibrillated cellulose, or both. In certain embodiments, the inorganic particulate material is incorporated during manufacture of the microfibrillated cellulose (for example, by co-processing, e.g., co-grinding, as described here) and the additive other than inorganic particulate material is added following manufacture of the aqueous composition comprising microfibrillated cellulose. In certain embodiments, additional inorganic particulate material (which may be the same or different than the inorganic particulate added during manufacture of the microfibrillated cellulose) may be added following manufacture of the microfibrillated cellulose, for example, contemporaneously with the addition of additive other than inorganic particulate material. In certain embodiments, the microfibrillated cellulose of the aqueous composition has a fibre steepness of from 20 to 50. Details of the inorganic particulate material, additives and amounts thereof are described below.

In a further aspect, the method of re-dispersing microfibrillated cellulose comprises re-dispersing dried or at least partially dried microfibrillated cellulose in a liquid medium and in the presence of an additive other than inorganic particulate material which enhances a mechanical and/or physical property of the re-dispersed microfibrillated. The microfibrillated cellulose prior to being to be dried or at least partially dried has a fibre steepness of from 20 to 50.

In yet a further aspect, the method of re-dispersing microfibrillated cellulose comprises re-dispersing dried or at least partially dried microfibrillated cellulose in a liquid medium and in the presence of a combination of inorganic particulate materials, wherein the combination of inorganic particulate materials enhances a mechanical and/or physical property of the re-dispersed microfibrillated. In certain embodiments, the combination of inorganic particulate materials comprises calcium carbonate and a platy mineral, for example, a platy kaolin, or talc.

In certain embodiments, the additive, when present, is a salt, sugar, glycol, urea, glycol, carboxymethyl cellulose, guar gum, or a combination thereof.

In certain embodiments, the additive, when present, is a salt, sugar, glycol, urea, glycol, guar gum, or a combination thereof.

In certain embodiments, sugar is selected from monosaccharides (e.g. glucose, fructose, galactose), disaccharides (e.g. lactose, maltose, sucrose), oilgosacchardies (chains of 50 or less units of one or more monosaccharides) polysaccharides and combinations thereof.

In certain embodiments, the salt is an alkali metal or alkaline earth metal chloride, for example, sodium, potassium, magnesium and/or calcium chloride. In certain embodiments, the salt comprises or is sodium chloride.

In certain embodiments, the glyclol is and alkylene glycol, for example, selected from ethylene, propylene and butylene glycol, and combinations thereof. In certain embodiments, the glycol comprises or is ethylene glycol.

In certain embodiments, the additive comprises or is urea.

In certain embodiments, the additive comprises or is guar gum.

In certain embodiments, the additive comprises or is carboxymethyl cellulose. In certain embodiments, the additive is not carboxymethyl cellulose.

In certain embodiments, the microfibrillated cellulose prior to drying or at least partially drying is not acetylsed. In certain embodiments, the microfibrillated cellulose prior to drying or at least partially drying is not subjected to acetylation.

The inorganic particulate material may be added at one or more of the following stages: (i) prior to or during manufacture of the aqueous composition comprising microfibrillated cellulose; (ii) following manufacture of the aqueous composition comprising microfibrillated cellulose; (iii) during dewatering of the aqueous composition of microfibrillated cellulose; (iv) during drying of the aqueous composition of microfibrillated cellulose; and (v) prior to or during re-dispersing of the dried or at least partially dried microfibrillated cellulose.

The re-dispersed microfibrillated cellulose has a mechanical and/or physical property which is closer to that of the microfibrillated cellulose prior to drying and re-dispersal than it would have been but for the presence of the inorganic particulate and/or additive. In other words, the presence of the inorganic particulate material and/or additive other than inorganic particulate material enhances a mechanical and/or physical property of the re-dispersed microfibrillated.

In certain embodiments, the re-dispersed microfibrillated cellulose has a mechanical and/or physical property which is closer to that of the microfibrillated cellulose prior to drying or at least partial drying than it would have been but for the presence of the inorganic particulate material and/or additive.

As described above, the mechanical property may be any determinable mechanical property associated with microfibrillated cellulose. For example, the mechanical property may be a strength property, for example, tensile index. Tensile index may be measured using a tensile tester. Any suitable method and apparatus may be used provided it is controlled in order to compare the tensile index of the microfibrillated cellulose before drying and after re-dispersal. For example, the comparison should be conducted at equal concentrations of microfibrillated cellulose, and any other additive or inorganic particulate material(s) which may be present. Tensile index may be expressed in any suitable units such as, for example, N·m/g or kN·m/kg.

The physical property may be any determinable physical property associated with microfibrillated cellulose. For example, the physical property may be viscosity. Viscosity may be measured using a viscometer. Any suitable method and apparatus may be used provided it is controlled in order to compare the viscosity of the microfibrillated cellulose prior to drying and after re-dispersal. For example, the comparison should be conducted at equal concentrations of microfibrillated cellulose, and any other additive or inorganic particulate material(s) which may be present. In certain embodiments, the viscosity is Brookfield viscosity, with units of mPa·s.

In certain embodiments, the tensile index and/or viscosity of the re-dispersed microfibrillated cellulose is at least about 25% of the tensile index and/or viscosity of the aqueous composition of microfibrillated cellulose prior to drying, for example, at least about 30%, or at least about 35%, or at least about 40%, or at least 45%, or at least about 50%, or at least about 55%, or at least about 60%, or at least about 65%, or at least about 70%, or at least about 75%, or at least about 80% of the tensile index and/or viscosity of the microfibrillated cellulose prior to drying.

For example, if the tensile index of the microfibrillated cellulose prior to drying was 8 N·m/g, then a tensile index of at least 50% of this value would be 4 N·m/g.

In certain embodiments, the tensile index of the re-dispersed microfibrillated cellulose is at least about 25% of the tensile index of the aqueous composition of microfibrillated cellulose prior to drying, for example, at least about 30%, or at least about 35%, or at least about 40%, or at least 45%, or at least about 50%, or at least about 55%, or at least about 60%, or at least about 65%, or at least about 70%, or at least about 75%, or at least about 80% of the tensile index of the microfibrillated cellulose prior to drying.

In certain embodiments, the viscosity of the re-dispersed microfibrillated cellulose is at least about 25% of the viscosity of the aqueous composition of microfibrillated cellulose prior to drying, for example, at least about 30%, or at least about 35%, or at least about 40%, or at least 45%, or at least about 50%, or at least about 55%, or at least about 60%, or at least about 65%, or at least about 70%, or at least about 75%, or at least about 80% of the viscosity of the microfibrillated cellulose prior to drying.

The inorganic particulate material and/or additive, when present, are present in sufficient amounts in order to enhance the re-dispersibility of the microfibrillated cellulose, i.e., enhances a mechanical and/or physical property of the re-dispersed microfibrillated.

Based on the total weight of the aqueous composition comprising microfibrillated cellulose (including inorganic particulate when present) prior to drying, the additive may be added in an amount of from about 0.1 wt. % to about 200 wt. %, from about 0.1 wt. % to about 100 wt. %, from about 0.1 wt. % to about wt. 80%, from about 0.1 wt. % to about wt. 60%, from about 0.1 wt. % to about wt. 40%, from about 0.1 wt. % to about 20 wt. %, or from about 0.25 wt. % to about 15 wt. %, or from about 0.5 wt. % to about 10 wt. %, or from about 0.5 wt. % to about 7.5 wt. %, or from about 0.5 wt. % to about 5 wt. %, or from about 0.5 wt. % to about 4 wt. %, or from about 9.5 wt. % to about 4 wt. %, or from about 1 wt. % to about 3 wt. %.

The aqueous composition comprising microfibrillated cellulose and optional inorganic particulate material may have a solids content of up to about 50 wt. % prior to drying, for example, up to about 40 wt. %, or up to about 30 wt. %, or up to about 20 wt. %, or up to about 15 wt. %, or up to about 10 wt. %, or up to about 5 wt. %, or up to about 4 wt. %, or up to about 3 wt. %, or up to about 2 wt. %, or up to about 2 wt. %.

Based on the solids content of the aqueous composition microfibrillated cellulose prior to drying, the inorganic particulate may constitute up to about 99% of the total solids content, for example, up to about 90%, or up to about 80 wt. %, or up to about 70 wt. %, or up to about 60 wt. %, or up to about 50 wt. %, or up to about 40%, or up to about 30%, or up to about 20%, or up to about 10%, or up to about 5% of the total solids content.

In certain embodiments, the weight ratio of inorganic particulate to microfibrillated cellulose in the aqueous composition is from about 10:1 to about 1:2, for example, from about 8:1 to about 1:1, or from about 6:1 to about 3:2, or from about 5:1 to about 2:1, or from about 5:1 to about 3:1, or about 4:1 to about 3:1, or about 4:1.

In certain embodiments, the aqueous composition of microfibrillated cellulose prior to drying or at least partially drying has a solids content of up to about 20 wt. %, optionally wherein up to about 80% of the solids is inorganic particulate material.

In certain embodiments, the aqueous composition is substantially free of inorganic particulate material prior to drying.

The inorganic particulate material may, for example, be an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, huntite, hydromagnesite, ground glass, perlite or diatomaceous earth, or wollastonite, or titanium dioxide, or magnesium hydroxide, or aluminium trihydrate, lime, graphite, or combinations thereof.

In certain embodiments, the inorganic particulate material comprises or is calcium carbonate, magnesium carbonate, dolomite, gypsum, an anhydrous kandite clay, perlite, diatomaceous earth, wollastonite, magnesium hydroxide, or aluminium trihydrate, titanium dioxide or combinations thereof.

In certain embodiments, the inorganic particulate material may be a surface-treated inorganic particulate material. For instance, the inorganic particulate material may be treated with a hydrophobizing agent, such as a fatty acid or salt thereof. For example, the inorganic particulate material may be a stearic acid treated calcium carbonate.

An exemplary inorganic particulate material for use in the present invention is calcium carbonate. Hereafter, the invention may tend to be discussed in terms of calcium carbonate, and in relation to aspects where the calcium carbonate is processed and/or treated. The invention should not be construed as being limited to such embodiments.

The particulate calcium carbonate used in the present invention may be obtained from a natural source by grinding. Ground calcium carbonate (GCC) is typically obtained by crushing and then grinding a mineral source such as chalk, marble or limestone, which may be followed by a particle size classification step, in order to obtain a product having the desired degree of fineness. Other techniques such as bleaching, flotation and magnetic separation may also be used to obtain a product having the desired degree of fineness and/or colour. The particulate solid material may be ground autogenously, i.e. by attrition between the particles of the solid material themselves, or, alternatively, in the presence of a particulate grinding medium comprising particles of a different material from the calcium carbonate to be ground. These processes may be carried out with or without the presence of a dispersant and biocides, which may be added at any stage of the process.

Precipitated calcium carbonate (PCC) may be used as the source of particulate calcium carbonate in the present invention, and may be produced by any of the known methods available in the art. TAPPI Monograph Series No 30, "Paper Coating Pigments", pages 34-35 describes the three main commercial processes for preparing precipitated calcium carbonate which is suitable for use in preparing products for use in the paper industry, but may also be used in the practice of the present invention. In all three processes, a calcium carbonate feed material, such as limestone, is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process the milk of lime is contacted with soda ash to produce, by double decomposition, a precipitate of calcium carbonate and a solution of sodium hydroxide. The sodium hydroxide may be substantially completely separated from the calcium carbonate if this process is used commercially. In the third main commercial process the milk of lime is first contacted with ammonium chloride to give a calcium chloride solution and ammonia gas. The calcium chloride solution is then contacted with soda ash to produce by double decomposition precipitated calcium carbonate and a solution of sodium chloride. The crystals can be produced in a variety of different shapes and sizes, depending on the specific reaction process that is used. The three main forms of PCC crystals are aragonite, rhombohedral and scalenohedral (e.g., calcite), all of which are suitable for use in the present invention, including mixtures thereof.

In certain embodiments, the PCC may be formed during the process of producing microfibrillated cellulose.

Wet grinding of calcium carbonate involves the formation of an aqueous suspension of the calcium carbonate which may then be ground, optionally in the presence of a suitable dispersing agent. Reference may be made to, for example, EP-A-614948 (the contents of which are incorporated by reference in their entirety) for more information regarding the wet grinding of calcium carbonate.

When the inorganic particulate material of the present invention is obtained from naturally occurring sources, it may be that some mineral impurities will contaminate the ground material. For example, naturally occurring calcium carbonate can be present in association with other minerals. Thus, in some embodiments, the inorganic particulate material includes an amount of impurities. In general, however, the inorganic particulate material used in the invention will contain less than about 5% by weight, or less than about 1% by weight, of other mineral impurities.

The inorganic particulate material may have a particle size distribution in which at least about 10% by weight of the particles have an e.s.d of less than 2 µm, for example, at least about 20% by weight, or at least about 30% by weight, or at least about 40% by weight, or at least about 50% by weight, or at least about 60% by weight, or at least about 70% by weight, or at least about 80% by weight, or at least about 90% by weight, or at least about 95% by weight, or about 100% of the particles have an e.s.d of less than 2 µm.

In another embodiment, the inorganic particulate material has a particle size distribution, as measured using a Malvern Mastersizer S machine, in which at least about 10% by volume of the particles have an e.s.d of less than 2 µm, for example, at least about 20% by volume, or at least about 30% by volume, or at least about 40% by volume, or at least about 50% by volume, or at least about 60% by volume, or at least about 70% by volume, or at least about 80% by volume, or at least about 90% by volume, or at least about 95% by volume, or about 100% of the particles by volume have an e.s.d of less than 2 µm.

Details of the procedure used to characterise the particle size distributions of mixtures of inorganic particle material and microfibrillated cellulose using a Malvern Mastersizer S machine are provided below.

In certain embodiments, the inorganic particulate material is or comprises kaolin clay. Hereafter, this section of the specification may tend to be discussed in terms of kaolin, and in relation to aspects where the kaolin is processed and/or treated. The invention should not be construed as being limited to such embodiments. Thus, in some embodiments, kaolin is used in an unprocessed form.

Kaolin clay used in this invention may be a processed material derived from a natural source, namely raw natural kaolin clay mineral. The processed kaolin clay may typically contain at least about 50% by weight kaolinite. For example, most commercially processed kaolin clays contain greater than about 75% by weight kaolinite and may contain greater than about 90%, in some cases greater than about 95% by weight of kaolinite.

Kaolin clay used in the present invention may be prepared from the raw natural kaolin clay mineral by one or more other processes which are well known to those skilled in the art, for example by known refining or beneficiation steps.

For example, the clay mineral may be bleached with a reductive bleaching agent, such as sodium hydrosulfite. If sodium hydrosulfite is used, the bleached clay mineral may optionally be dewatered, and optionally washed and again optionally dewatered, after the sodium hydrosulfite bleaching step.

The clay mineral may be treated to remove impurities, e.g. by flocculation, flotation, or magnetic separation techniques well known in the art. Alternatively the clay mineral used in the first aspect of the invention may be untreated in the form of a solid or as an aqueous suspension.

The process for preparing the particulate kaolin clay may also include one or more comminution steps, e.g., grinding or milling. Light comminution of a coarse kaolin is used to give suitable delamination thereof. The comminution may be carried out by use of beads or granules of a plastic (e.g. nylon), sand or ceramic grinding or milling aid. The coarse kaolin may be refined to remove impurities and improve physical properties using well known procedures. The kaolin clay may be treated by a known particle size classification procedure, e.g., screening and centrifuging (or both), to obtain particles having a desired $d_{50}$ value or particle size distribution.

In certain embodiments, the inorganic particulate material is or comprises a platy mineral, for example, kaolin and/or talc, optionally in combination with another inorganic particulate material, such as, for example, calcium carbonate.

By 'platy' kaolin is meant kaolin a kaolin product having a high shape factor. A platy kaolin has a shape factor from about 20 to less than about 60. A hyper-platy kaolin has a shape factor from about 60 to 100 or even greater than 100. "Shape factor", as used herein, is a measure of the ratio of particle diameter to particle thickness for a population of particles of varying size and shape as measured using the electrical conductivity methods, apparatuses, and equations described in U.S. Pat. No. 5,576,617, which is incorporated herein by reference. As the technique for determining shape factor is further described in the '617 patent, the electrical conductivity of a composition of an aqueous suspension of orientated particles under test is measured as the composition flows through a vessel. Measurements of the electrical conductivity are taken along one direction of the vessel and along another direction of the vessel transverse to the first direction. Using the difference between the two conductivity measurements, the shape factor of the particulate material under test is determined.

In certain embodiments, the inorganic particulate material is or comprises talc, optionally in combination with another inorganic particulate material, such as, for example, calcium carbonate.

In certain embodiments, the inorganic particulate material is calcium carbonate, which may be surface treated, and the aqueous composition further comprises one or more of the additives other than inorganic particulate material as described herein.

In certain embodiments, the inorganic particulate material is kaolin, for example, a platy or hyper play kaolin, which may be surface treated, and the aqueous composition further comprises one or more of the additives other than inorganic particulate material as described herein.

In certain embodiments, the inorganic particulate material is talc, which may be surface treated, and the aqueous composition further comprises one or more of the additives other than inorganic particulate material as described herein.

In certain embodiments, the aqueous composition comprising microfibrillated cellulose is free of inorganic particulate material, and the aqueous composition further comprises one or more of the additives other than inorganic particulate material as described herein.

The various methods described herein provide for the manufacture of re-dispersed microfibrillated cellulose having advantageous properties.

Thus, in a further aspect, there is provided a composition comprising re-dispersed microfibrillated cellulose dispersed in a liquid medium and which is obtainable by a method according to any one of method aspects described herein, and having, at a comparable concentration, a tensile index and/or viscosity which is at least 50% of the tensile index and/or viscosity of the aqueous composition of microfibrillated cellulose prior to drying, wherein either (i) the microfibrillated cellulose of the aqueous composition has a fibre steepness of from 20 to 50, and/or (ii) the aqueous composition of microfibrillated cellulose comprises inorganic particulate material, and optionally further comprises an additive other than inorganic particulate material.

The re-dispersed microfibrillated cellulose may be used, in an article, product, or composition, for example, paper, paperboard, polymeric articles, paints, and the like.

Methods of Manufacturing Microfibrillated Cellulose and Optional Inorganic Particulate Material In certain embodiments, the microfibrillated cellulose may be prepared in the presence of or in the absence of the inorganic particulate material.

The microfibrillated cellulose is derived from fibrous substrate comprising cellulose. The fibrous substrate comprising cellulose may be derived from any suitable source, such as wood, grasses (e.g., sugarcane, bamboo) or rags (e.g., textile waste, cotton, hemp or flax). The fibrous substrate comprising cellulose may be in the form of a pulp (i.e., a suspension of cellulose fibres in water), which may be prepared by any suitable chemical or mechanical treatment, or combination thereof. For example, the pulp may be a chemical pulp, or a chemithermomechanical pulp, or a mechanical pulp, or a recycled pulp, or a papermill broke, or a papermill waste stream, or waste from a papermill, or a dissolving pulp, kenaf pulp, market pulp, partially carboxymethylated pulp, abaca pulp, hemlock pulp, birch pulp, grass pulp, bamboo pulp, palm pulp, peanut shell, or a combination thereof. The cellulose pulp may be beaten (for example in a Valley beater) and/or otherwise refined (for example, processing in a conical or plate refiner) to any predetermined freeness, reported in the art as Canadian standard freeness (CSF) in $cm^3$. CSF means a value for the freeness or drainage rate of pulp measured by the rate that a suspension of pulp may be drained. For example, the cellulose pulp may have a Canadian standard freeness of about 10 $cm^3$ or greater prior to being microfibrillated. The cellulose pulp may have a CSF of about 700 $cm^3$ or less, for example, equal to or less than about 650 $cm^3$, or equal to or less than about 600 $cm^3$, or equal to or less than about 550 $cm^3$, or equal to or less than about 500 $cm^3$, or equal to or less than about 450 $cm^3$, or equal to or less than about 400 $cm^3$, or equal to or less than about 350 $cm^3$, or equal to or less than about 300 $cm^3$, or equal to or less than about 250 $cm^3$, or equal to or less than about 200 $cm^3$, or equal to or less than about 150 $cm^3$, or equal to or less than about 100 $cm^3$, or equal to or less than about 50 $cm^3$. The cellulose pulp may then be dewatered by methods well known in the art, for example, the pulp may be filtered through a screen in order to obtain a wet sheet comprising at least about 10% solids, for example at least about 15% solids, or at least about 20% solids, or at least about 30% solids, or at least about 40% solids. The pulp may be utilised in an unrefined state, that is to say, without being beaten or dewatered, or otherwise refined.

In certain embodiments, the pulp may be beaten in the presence of an inorganic particulate material, such as calcium carbonate.

For preparation of microfibrillated cellulose, the fibrous substrate comprising cellulose may be added to a grinding vessel or homogenizer in a dry state. For example, a dry paper broke may be added directly to a grinder vessel. The aqueous environment in the grinder vessel will then facilitate the formation of a pulp.

The step of microfibrillating may be carried out in any suitable apparatus, including but not limited to a refiner. In one embodiment, the microfibrillating step is conducted in a grinding vessel under wet-grinding conditions. In another embodiment, the microfibrillating step is carried out in a homogenizer. Each of these embodiments is described in greater detail below.

Wet-Grinding

The grinding is suitably performed in a conventional manner. The grinding may be an attrition grinding process in the presence of a particulate grinding medium, or may be an autogenous grinding process, i.e., one in the absence of a grinding medium. By grinding medium is meant a medium other than the inorganic particulate material which in certain embodiments may be co-ground with the fibrous substrate comprising cellulose.

The particulate grinding medium, when present, may be of a natural or a synthetic material. The grinding medium may, for example, comprise balls, beads or pellets of any hard mineral, ceramic or metallic material. Such materials may include, for example, alumina, zirconia, zirconium silicate, aluminium silicate or the mullite-rich material which is produced by calcining kaolinitic clay at a temperature in the range of from about 1300° C. to about 1800° C. For example, in some embodiments a Carbolite® grinding media is used. Alternatively, particles of natural sand of a suitable particle size may be used.

In other embodiments, hardwood grinding media (e.g., woodflour) may be used.

Generally, the type of and particle size of grinding medium to be selected for use in the invention may be dependent on the properties, such as, e.g., the particle size of, and the chemical composition of, the feed suspension of material to be ground. In some embodiments, the particulate grinding medium comprises particles having an average diameter in the range of from about 0.1 mm to about 6.0 mm, for example, in the range of from about 0.2 mm to about 4.0 mm. The grinding medium (or media) may be present in an amount up to about 70% by volume of the charge. The grinding media may be present in amount of at least about 10% by volume of the charge, for example, at least about 20% by volume of the charge, or at least about 30% by volume of the charge, or at least about 40% by volume of the charge, or at least about 50% by volume of the charge, or at least about 60% by volume of the charge.

The grinding may be carried out in one or more stages. For example, a coarse inorganic particulate material may be ground in the grinder vessel to a predetermined particle size distribution, after which the fibrous material comprising cellulose is added and the grinding continued until the desired level of microfibrillation has been obtained.

The inorganic particulate material may be wet or dry ground in the absence or presence of a grinding medium. In the case of a wet grinding stage, the coarse inorganic particulate material is ground in an aqueous suspension in the presence of a grinding medium.

In one embodiment, the mean particle size ($d_{50}$) of the inorganic particulate material is reduced during the co-grinding process. For example, the $d_{50}$ of the inorganic particulate material may be reduced by at least about 10% (as measured by a Malvern Mastersizer S machine), for example, the $d_{50}$ of the inorganic particulate material may be reduced by at least about 20%, or reduced by at least about 30%, or reduced by at least about 50%, or reduced by at least about 50%, or reduced by at least about 60%, or reduced by at least about 70%, or reduced by at least about 80%, or reduced by at least about 90%. For example, an inorganic particulate material having a $d_{50}$ of 2.5 µm prior to co-grinding and a $d_{50}$ of 1.5 µm post co-grinding will have been subject to a 40% reduction in particle size. In certain embodiments, the mean particle size of the inorganic particulate material is not significantly reduced during the co-grinding process. By 'not significantly reduced' is meant that the $d_{50}$ of the inorganic particulate material is reduced by less than about 10%, for example, the do of the inorganic particulate material is reduced by less than about 5%.

The fibrous substrate comprising cellulose may be microfibrillated, optionally in the presence of an inorganic particulate material, to obtain microfibrillated cellulose having a $d_{50}$ ranging from about 5 to μm about 500 μm, as measured by laser light scattering. The fibrous substrate comprising cellulose may be microfibrillated, optionally in the presence of an inorganic particulate material, to obtain microfibrillated cellulose having a $d_{50}$ of equal to or less than about 400 μm, for example equal to or less than about 300 μm, or equal to or less than about 200 μm, or equal to or less than about 150 μm, or equal to or less than about 125 μm, or equal to or less than about 100 μm, or equal to or less than about 90 μm, or equal to or less than about 80 μm, or equal to or less than about 70 μm, or equal to or less than about 60 μm, or equal to or less than about 50 μm, or equal to or less than about 40 μm, or equal to or less than about 30 μm, or equal to or less than about 20 μm, or equal to or less than about 10 μm.

The fibrous substrate comprising cellulose may be microfibrillated, optionally in the presence of an inorganic particulate material, to obtain microfibrillated cellulose having a modal fibre particle size ranging from about 0.1-500 μm and a modal inorganic particulate material particle size ranging from 0.25-20 μm. The fibrous substrate comprising cellulose may be microfibrillated, optionally in the presence of an inorganic particulate material to obtain microfibrillated cellulose having a modal fibre particle size of at least about 0.5 μm, for example at least about 10 μm, or at least about 50 μm, or at least about 100 μm, or at least about 150 μm, or at least about 200 μm, or at least about 300 μm, or at least about 400 μm.

The fibrous substrate comprising cellulose may be microfibrillated, optionally in the presence of an inorganic particulate material, to obtain microfibrillated cellulose having a fibre steepness, as described above.

The grinding may be performed in a grinding vessel, such as a tumbling mill (e.g., rod, ball and autogenous), a stirred mill (e.g., SAM or IsaMill), a tower mill, a stirred media detritor (SMD), or a grinding vessel comprising rotating parallel grinding plates between which the feed to be ground is fed.

In one embodiment, the grinding vessel is a tower mill. The tower mill may comprise a quiescent zone above one or more grinding zones. A quiescent zone is a region located towards the top of the interior of tower mill in which minimal or no grinding takes place and comprises microfibrillated cellulose and optional inorganic particulate material. The quiescent zone is a region in which particles of the grinding medium sediment down into the one or more grinding zones of the tower mill.

The tower mill may comprise a classifier above one or more grinding zones. In an embodiment, the classifier is top mounted and located adjacent to a quiescent zone. The classifier may be a hydrocyclone.

The tower mill may comprise a screen above one or more grind zones. In an embodiment, a screen is located adjacent to a quiescent zone and/or a classifier. The screen may be sized to separate grinding media from the product aqueous suspension comprising microfibrillated cellulose and optional inorganic particulate material and to enhance grinding media sedimentation.

In an embodiment, the grinding is performed under plug flow conditions. Under plug flow conditions the flow through the tower is such that there is limited mixing of the grinding materials through the tower. This means that at different points along the length of the tower mill the viscosity of the aqueous environment will vary as the fineness of the microfibrillated cellulose increases. Thus, in effect, the grinding region in the tower mill can be considered to comprise one or more grinding zones which have a characteristic viscosity. A skilled person in the art will understand that there is no sharp boundary between adjacent grinding zones with respect to viscosity.

In an embodiment, water is added at the top of the mill proximate to the quiescent zone or the classifier or the screen above one or more grinding zones to reduce the viscosity of the aqueous suspension comprising microfibrillated cellulose and optional inorganic particulate material at those zones in the mill. By diluting the product microfibrillated cellulose and optional inorganic particulate material at this point in the mill it has been found that the prevention of grinding media carry over to the quiescent zone and/or the classifier and/or the screen is improved. Further, the limited mixing through the tower allows for processing at higher solids lower down the tower and dilute at the top with limited backflow of the dilution water back down the tower into the one or more grinding zones. Any suitable amount of water which is effective to dilute the viscosity of the product aqueous suspension comprising microfibrillated cellulose and optional inorganic particulate material may be added. The water may be added continuously during the grinding process, or at regular intervals, or at irregular intervals.

In another embodiment, water may be added to one or more grinding zones via one or more water injection points positioned along the length of the tower mill, or each water injection point being located at a position which corresponds to the one or more grinding zones. Advantageously, the ability to add water at various points along the tower allows for further adjustment of the grinding conditions at any or all positions along the mill.

The tower mill may comprise a vertical impeller shaft equipped with a series of impeller rotor disks throughout its length. The action of the impeller rotor disks creates a series of discrete grinding zones throughout the mill.

In another embodiment, the grinding is performed in a screened grinder, such as a stirred media detritor. The screened grinder may comprise one or more screen(s) having a nominal aperture size of at least about 250 μm, for example, the one or more screens may have a nominal aperture size of at least about 300 μm, or at least about 350 μm, or at least about 400 μm, or at least about 450 μm, or at least about 500 μm, or at least about 550 μm, or at least about 600 μm, or at least about 650 μm, or at least about 700 μm, or at least about 750 μm, or at least about 800 μm, or at least about 850 μm, or at or least about 900 μm, or at least about 1000 μm.

The screen sizes noted immediately above are applicable to the tower mill embodiments described above.

As noted above, the grinding may be performed in the presence of a grinding medium. In an embodiment, the grinding medium is a coarse media comprising particles having an average diameter in the range of from about 1 mm to about 6 mm, for example about 2 mm, or about 3 mm, or about 4 mm, or about 5 mm.

In another embodiment, the grinding media has a specific gravity of at least about 2.5, for example, at least about 3, or at least about 3.5, or at least about 4.0, or at least about 4.5, or least about 5.0, or at least about 5.5, or at least about 6.0.

In another embodiment, the grinding media comprises particles having an average diameter in the range of from about 1 mm to about 6 mm and has a specific gravity of at least about 2.5.

In another embodiment, the grinding media comprises particles having an average diameter of about 3 mm and specific gravity of about 2.7.

As described above, the grinding medium (or media) may present in an amount up to about 70% by volume of the charge. The grinding media may be present in amount of at least about 10% by volume of the charge, for example, at least about 20% by volume of the charge, or at least about 30% by volume of the charge, or at least about 40% by volume of the charge, or at least about 50% by volume of the charge, or at least about 60% by volume of the charge.

In one embodiment, the grinding medium is present in amount of about 50% by volume of the charge.

By 'charge' is meant the composition which is the feed fed to the grinder vessel. The charge includes of water, grinding media, fibrous substrate comprising cellulose and optional inorganic particulate material, and any other optional additives as described herein.

The use of a relatively coarse and/or dense media has the advantage of improved (i.e., faster) sediment rates and reduced media carry over through the quiescent zone and/or classifier and/or screen(s).

A further advantage in using relatively coarse grinding media is that the mean particle size ($d_{50}$) of the inorganic particulate material may not be significantly reduced during the grinding process such that the energy imparted to the grinding system is primarily expended in microfibrillating the fibrous substrate comprising cellulose.

A further advantage in using relatively coarse screens is that a relatively coarse or dense grinding media can be used in the microfibrillating step. In addition, the use of relatively coarse screens (i.e., having a nominal aperture of least about 250 μm) allows a relatively high solids product to be processed and removed from the grinder, which allows a relatively high solids feed (comprising fibrous substrate comprising cellulose and inorganic particulate material) to be processed in an economically viable process. As discussed below, it has been found that a feed having a high initial solids content is desirable in terms of energy sufficiency. Further, it has also been found that product produced (at a given energy) at lower solids has a coarser particle size distribution.

The grinding may be performed in a cascade of grinding vessels, one or more of which may comprise one or more grinding zones. For example, the fibrous substrate comprising cellulose and the inorganic particulate material may be ground in a cascade of two or more grinding vessels, for example, a cascade of three or more grinding vessels, or a cascade of four or more grinding vessels, or a cascade of five or more grinding vessels, or a cascade of six or more grinding vessels, or a cascade of seven or more grinding vessels, or a cascade of eight or more grinding vessels, or a cascade of nine or more grinding vessels in series, or a cascade comprising up to ten grinding vessels. The cascade of grinding vessels may be operatively linked in series or parallel or a combination of series and parallel. The output from and/or the input to one or more of the grinding vessels in the cascade may be subjected to one or more screening steps and/or one or more classification steps.

The circuit may comprise a combination of one or more grinding vessels and homegenizer.

In an embodiment the grinding is performed in a closed circuit. In another embodiment, the grinding is performed in an open circuit. The grinding may be performed in batch mode. The grinding may be performed in a re-circulating batch mode.

As described above, the grinding circuit may include a pre-grinding step in which coarse inorganic particulate ground in a grinder vessel to a predetermined particle size distribution, after which fibrous material comprising cellulose is combined with the pre-ground inorganic particulate material and the grinding continued in the same or different grinding vessel until the desired level of microfibrillation has been obtained.

As the suspension of material to be ground may be of a relatively high viscosity, a suitable dispersing agent may be added to the suspension prior to grinding. The dispersing agent may be, for example, a water soluble condensed phosphate, polysilicic acid or a salt thereof, or a polyelectrolyte, for example a water soluble salt of a poly(acrylic acid) or of a poly(methacrylic acid) having a number average molecular weight not greater than 80,000. The amount of the dispersing agent used would generally be in the range of from 0.1 to 2.0% by weight, based on the weight of the dry inorganic particulate solid material. The suspension may suitably be ground at a temperature in the range of from 4° C. to 100° C.

Other additives which may be included during the microfibrillation step include: carboxymethyl cellulose, amphoteric carboxymethyl cellulose, oxidising agents, 2,2,6,6-Tetramethylpiperidine-1-oxyl (TEMPO), TEMPO derivatives, and wood degrading enzymes.

The pH of the suspension of material to be ground may be about 7 or greater than about 7 (i.e., basic), for example, the pH of the suspension may be about 8, or about 9, or about 10, or about 11. The pH of the suspension of material to be ground may be less than about 7 (i.e., acidic), for example, the pH of the suspension may be about 6, or about 5, or about 4, or about 3. The pH of the suspension of material to be ground may be adjusted by addition of an appropriate amount of acid or base. Suitable bases included alkali metal hydroxides, such as, for example NaOH. Other suitable bases are sodium carbonate and ammonia. Suitable acids included inorganic acids, such as hydrochloric and sulphuric acid, or organic acids. An exemplary acid is orthophosphoric acid.

The amount of inorganic particulate material, when present, and cellulose pulp in the mixture to be co-ground may be varied in order to produce a slurry which is suitable for drying and re-dispersal, and/or which may be further modified, e.g., with additional of further inorganic particulate material and/or additive other than inorganic particulate material, to produce a slurry which is suitable for drying or at least partially drying, optional transport to another location, re-dispersal and use in the manufacture of an article, product or composition.

Homogenizing

Microfibrillation of the fibrous substrate comprising cellulose may be effected under wet conditions, optionally, in the presence of the inorganic particulate material, by a method in which the mixture of cellulose pulp and optional inorganic particulate material is pressurized (for example, to a pressure of about 500 bar) and then passed to a zone of lower pressure. The rate at which the mixture is passed to the low pressure zone is sufficiently high and the pressure of the low pressure zone is sufficiently low as to cause microfibrillation of the cellulose fibres. For example, the pressure drop may be effected by forcing the mixture through an annular opening that has a narrow entrance orifice with a much larger exit orifice. The drastic decrease in pressure as the mixture accelerates into a larger volume (i.e., a lower pressure zone) induces cavitation which causes microfibrillation. In an embodiment, microfibrillation of the fibrous substrate comprising cellulose may be effected in a homogenizer under wet conditions, optionally in the presence of the inorganic particulate material. In the homogenizer, the cellulose pulp and optional inorganic particulate material is pressurized (for example, to a pressure of about 500 bar), and forced through a small nozzle or orifice. The mixture may be pressurized to a pressure of from about 100 to about 1000 bar, for example to a pressure of equal to or greater than 300 bar, or equal to or greater than about 500, or equal to or greater than about 200 bar, or equal to or greater than about 700 bar. The homogenization subjects the fibres to high shear forces such that as the pressurized cellulose pulp exits the nozzle or orifice, cavitation causes microfibrillation of the cellulose fibres in the pulp. Additional water may be added to improve flowability of the suspension through the homogenizer. The resulting aqueous suspension comprising microfibrillated cellulose and optional inorganic particulate material may be fed back into the inlet of the homogenizer for multiple passes through the homogenizer. When present, and when the inorganic particulate material is a naturally platy mineral, such as kaolin, homogenization not only facilitates microfibrillation of the cellulose pulp, but may also facilitate delamination of the platy particulate material.

An exemplary homogenizer is a Manton Gaulin (APV) homogenizer.

After the microfibrillation step has been carried out, the aqueous suspension comprising microfibrillated cellulose and optional inorganic particulate material may be screened to remove fibre above a certain size and to remove any grinding medium. For example, the suspension can be subjected to screening using a sieve having a selected nominal aperture size in order to remove fibres which do not pass through the sieve. Nominal aperture size means the nominal central separation of opposite sides of a square aperture or the nominal diameter of a round aperture. The sieve may be a BSS sieve (in accordance with BS 1796) having a nominal aperture size of 150 μm, for example, a nominal aperture size 125 μm, or 106 μm, or 90 μm, or 74 μm, or 63 μm, or 53 μm, 45 μm, or 38 μm. In one embodiment, the aqueous suspension is screened using a BSS sieve having a nominal aperture of 125 μm. The aqueous suspension may then be optionally dewatered.

It will be understood therefore that amount (i.e., % by weight) of microfibrillated cellulose in the aqueous suspension after grinding or homogenizing may be less than the amount of dry fibre in the pulp if the ground or homogenized suspension is treated to remove fibres above a selected size. Thus, the relative amounts of pulp and optional inorganic particulate material fed to the grinder or homogenizer can be adjusted depending on the amount of microfibrillated cellulose that is required in the aqueous suspension after fibres above a selected size are removed.

In certain embodiments, the microfibrillated cellulose may be prepared by a method comprising a step of microfibrillating the fibrous substrate comprising cellulose in an aqueous environment by grinding in the presence of a grinding medium (as described herein), wherein the grinding is carried out in the absence of inorganic particulate material. In certain embodiments, inorganic particulate material may be added after grinding to produce the top ply slurry, or ply slurry.

In certain embodiments, the grinding medium is removed after grinding.

In other embodiments, the grinding medium is retained after grinding and may serve as the inorganic particulate material, or at least a portion thereof. In certain embodiments, additional inorganic particulate and/or additive other than inorganic particulate material may be added after grinding.

The following procedure may be used to characterise the particle size distributions of mixtures of inorganic particulate material (e.g., GCC or kaolin) and microfibrillated cellulose pulp fibres.

Calcium Carbonate A sample of co-ground slurry sufficient to give 3 g dry material is weighed into a beaker, diluted to 60 g with deionised water, and mixed with 5 cm$^3$ of a solution of sodium polyacrylate of 1.5 w/v % active. Further deionised water is added with stirring to a final slurry weight of 80 g.

Kaolin

A sample of co-ground slurry sufficient to give 5 g dry material is weighed into a beaker, diluted to 60 g with deionised water, and mixed with 5 cm$^3$ of a solution of 1.0 wt % sodium carbonate and 0.5 wt % sodium hexametaphosphate. Further deionised water is added with stirring to a final slurry weight of 80 g.

The slurry is then added in 1 cm$^3$ aliquots to water in the sample preparation unit attached to the Mastersizer S until the optimum level of obscuration is displayed (normally 10-15%). The light scattering analysis procedure is then carried out. The instrument range selected was 300RF: 0.05-900, and the beam length set to 2.4 mm.

For co-ground samples containing calcium carbonate and fibre the refractive index for calcium carbonate (1.596) is used. For co-ground samples of kaolin and fibre the RI for kaolin (1.5295) is used.

The particle size distribution is calculated from Mie theory and gives the output as a differential volume based distribution. The presence of two distinct peaks is interpreted as arising from the mineral (finer peak) and fibre (coarser peak).

The finer mineral peak is fitted to the measured data points and subtracted mathematically from the distribution to leave the fibre peak, which is converted to a cumulative distribution. Similarly, the fibre peak is subtracted mathematically from the original distribution to leave the mineral peak, which is also converted to a cumulative distribution. Both these cumulative curves may then be used to calculate the mean particle size ($d_{50}$) and the steepness of the distribution ($d_{30}/d_{70} \times 100$). The differential curve may be used to find the modal particle size for both the mineral and fibre fractions.

EXAMPLES

Example 1

A number of aqueous compositions comprising microfibrillated cellulose and inorganic particulate material were prepared by co-grinding Botnia pulp in the presence of the inorganic particulate materials, as described in detail elsewhere in this specification. Properties of each composition are summarized in Table 1. POP refers to the "percentage of pulp" wherein the POP is the percentage of the dry weight of the sample that is pulp or fibrils rather than inorganic particulate material.

TABLE 1

| Composition | Total solids (wt %) | POP (wt %) | Tensile index (nm/g) | Brookfield Viscosity (mPas) |
|---|---|---|---|---|
| 50 POP Botnia/Calcium Carbonate | 2.5 | 47.4 | 8.5 | 1280 |
| 50 POP Botnia/Kaolin | 2.2 | 49.5 | 7.1 | 2780 |

TABLE 1-continued

| Composition | Total solids (wt %) | POP (wt %) | Tensile index (nm/g) | Brookfield Viscosity (mPas) |
|---|---|---|---|---|
| 20 POP Botnia/Kaolin | 4.9 | 21.8 | 8.0 | 3540 |
| 50 POP Botnia/Talc | 1.9 | 51.0 | 9.4 | 1600 |

Example 2

An additive was added to each slurry and mixed for 1 minute. The mixture was allowed to stand for 60 minutes and then was filtered. The resultant filter cake was placed in a laboratory oven at 80° C. until dry (<1 wt. % moisture).

The dried composition was then re-dispersed on a laboratory Silverson mixer. (Diluted to 20 POP, 1 minute Silverson mixing)

Each of compositions 1 through 4 was additized with different additives (sodium chloride, glycol, urea, carboxymethyl cellulose, sugar and guar gum) at varying concentrations and tensile index determined. Averaged results are summarized in Table 2.

TABLE 2

| Composition | Reduction in tensile index upon drying (%) | Reduction in tensile index upon drying with additive (%) |
|---|---|---|
| 50 POP Calcium Carbonate/Botnia | 53 | 25 |
| 50 POP Kaolin/Botnia | 25 | 0 |
| 20 POP Kaolin/Botnia | 34 | 28 |
| 50 POP Talc/Botnia | 37 | 32 |

Example 3

The purpose of these trials was to evaluate the effectiveness of re-dispersing a 50 wt. % POP (percentage of pulp) calcium carbonate/Botnia pulp high solids microfibrillated cellulose and calcium caerbonate composition (i.e., a 1:1 wt. ratio of microfibrillated cellulose to calcium carbonate) using a single disc refiner available at a pilot plant facility. An example of a single disc refiner suitable for use in the present invention was manufactured by Sprout Waldron. The refiner was a 12 in (30 cm) single disc refiner. Disc rotational speed was 1320 rpm. Disc peripheral velocity was 21.07 m/s. Refiner Disc Design Bar width 1.5 mm; groove width 1.5 mm; bar cutting edge length 1.111 Km/rev bar CEL @ 1320 rpm 24.44 Km/sec. Other suitable refiners with equivalent specifications are known to those of ordinary skill in the art.

Feed Materials.

Transported to the pilot plant facility was 100 kg of belt press cake of microfibrillated cellulose and calcium carbonate (1:1 weight ratio) and 100 kg of four different feed materials made utilizing an Atritor dryer-pulverizer (available from Atritor Limited, 12 The Stampings, Blue Ribbon Park, Coventry, West Midlands, England), which is an air-swept mill or dryer having the capability to introduce a stream of hot air for drying and milling materials, in order to process and dry the microfibrillated cellulose and calcium carbonate composition utilized in the trials. Other equivalent mills are known to one of ordinary skill in the art. The properties of the calcium carbonate (IC60L)/Botnia high solids microfibrillated cellulose products utilized in the trials are shown in Table 3. These microfibrillated cellulose and calcium carbonate compositions (1:1 wt. ratio) were produced using an Atritor dryer with the rejector arms in place and fed at 20 Hz (slow feed rate).

TABLE 3

Properties of the feed materials used for the single disc refined trial.

| Feed Bag | Total solids wt. % | POP wt. % | FLT Index* Nm/g | gsm | Viscosity mPas |
|---|---|---|---|---|---|
| 50 POP IC60/Botnia Beltpress cake | 30.8 | 49.2 | 8.5 | 223 | 1440 |
| Atritor product bag 6 50 POP IC60/Botnia | 51.4 | 50.6 | 8.1 | 226 | 1340 |
| Atritor product bag 3 50 POP IC60/Botnia | 58.1 | 47.6 | 7.1 | 223 | 940 |
| Atritor product bag 2 50 POP IC60/Botnia | 69.5 | 47.3 | 4.9 | 225 | 640 |
| Atritor product bag 1 50 POP IC60/Botnia | 87.5 | 46.7 | 3.6 | 221 | 480 |

*After 1 minute of re-dispersion (between 1000-2000 kWh/t) using a laboratory scale Silverson mixer.

Trial Outline

Each material was "wetted" in a large pulper to replicate typical times/actions in a paper mill operation.

The pulped samples passed through the single disc refiner with samples taken at refining energy inputs ranging between 0-20-40-60-80-100 kWh/t of total dry solids.

Results.

1. 50 wt. % POP Calcium Carbonate (IC60)/Botnia Pulp (31 wt. % Solids) Belt Press Cake This 30.5 wt. % solids belt pressed cake of a composition comprising microfibrillated cellulose and calcium carbonate (1:1 wt. ratio) was initially re-dispersed in the pulper for 15 minutes at 7 wt. % solids. This consistency was too viscous to pump so the material was diluted with water by 1 wt. % to 6 wt. % solids. This material was then passed through the refiner and samples were taken at various work inputs.

Table 4 below shows the effect of the single disc refiner on the properties of the belt pressed cake comprising microfibrillated cellulose and calcium carbonate. The values quoted for the as received material have been subjected to 1 minute of mixing in a Silverson mixer (Silverson Machines, Inc., 55 Chestnut St. East Longmeadow, Mass. 01028) which equates to 1000-2000 kWh/t.

TABLE 4

Properties of the single disc refined belt pressed cake

| Feed Bag | Feed Bag total solids wt. % | Refiner solids wt. % | Energy kWh/T | Total solids | POP wt. % | FLT Index Nm/g | gsm | Viscosity mPas | Total Nib Surface Area per gram mm$^2$/g |
|---|---|---|---|---|---|---|---|---|---|
| 50 POP IC60 | 30.5 | 7 | as rec'd | 30.8 | 49.2 | [8.5] | [223] | [1440] | [0] |
| Beltpress cake | | | 0 | 6.4 | 49.0 | 5.5 | 222 | 980 | 5 |
| 50 POP IC60/Botnia | 30.5 | 6 | as rec'd | 30.8 | 49.2 | [8.5] | [223] | [1440] | [0] |
| Beltpress cake | | | 0 | 5.3 | 49.0 | 6.7 | 227 | 1220 | 2 |
| | | | 20 | 5.9 | 49.0 | 9.7 | 227 | 1960 | 1 |
| | | | 40 | 5.7 | 49.1 | 8.5 | 220 | 1460 | 1 |
| | | | 60 | 5.9 | 49.0 | 10.4 | 228 | 1940 | 1 |
| | | | 80 | 6.0 | 49.2 | 10.6 | 231 | 1840 | 1 |
| | | | 100 | 6.0 | 49.2 | 11.3 | 224 | 1860 | 0 |

It can be seen that the belt press cake can be refined at 6 wt. % solids and after an input of 20 kWh/t the FLT Index has been restored. The FLT index is a tensile test developed to assess the quality of microfibrillated cellulose and re-dispersed microfibrillated cellulose. The POP of the test material is adjusted to 20% by adding whichever inorganic particulate was used in the production of the microfibrillated cellulose/inorganic material composite (in the case of inorganic particulate free microfibrillated cellulose then 60 wt. %<2 um GCC calcium carbonate is used). A 220 gsm (g/m$^2$) sheet is formed from this material using a bespoke Buchner filtration apparatus The resultant sheet is conditioned and its tensile strength measured using an industry standard tensile tester. Energy inputs up to 100 kWh/t can improve both the FLT Index and viscosity of the microfibrillated cellulose and calcium carbonate composition. The "nib count" of 1 and below is acceptable and suggests good formation of a paper sheet. As is known to one of ordinary skill in the art, the nib count is a dirt count test (see for example the TAPPI dirt count test) and is an indication that the microfibrillated cellulose has been fully redispersed. In this case the sheets formed to measure the FLT index are subjected to nib counting using a light box prior to the destructive tensile testing. A low nib count is indicative of good redispersion in any aqueous application.

Table 5 shows the effect the single disc refiner has had upon the particle size of the microfibrillated cellulose and calcium carbonate composition. The particle size distribution ("PSD") has been measured on a Malvern Insitec (Malvern Instruments Ltd, Enigma Business Park, Grovewood Road, Malvern, WR14 1XZ, United Kingdom) located at the quality control laboratory facility.

TABLE 5

PSD properties of the single disc refined pressed cake

| Trial ID | Refiner solids wt. % | Energy kWh/T | Total solids wt. % | Malvern Insitec | | | | | Fractionation | | | |
| | | | | D10 | D30 | D50 | D70 | D90 | −25 um | +25-150 um | +150-300 um | +300 um |
|---|---|---|---|---|---|---|---|---|---|---|---|---|
| 50 POP IC60 | 7 | as rec'd | 30.8 | 11.7 | 44.4 | 102.6 | 210.5 | 508.2 | 20.3 | 40.3 | 18.4 | 21.0 |
| Beltpress cake | | 0 | 6.4 | 13.8 | 53.9 | 119.4 | 228.7 | 492.6 | 17.5 | 39.3 | 21.2 | 22.0 |
| 50 POP IC60/Botnia | 6 | as rec'd | 30.8 | 11.7 | 44.4 | 102.6 | 210.5 | 508.2 | 20.3 | 40.3 | 18.4 | 21.0 |
| Beltpress cake | | 0 | 5.3 | 13.4 | 51.6 | 114.9 | 223.9 | 508.5 | 18.1 | 39.9 | 20.2 | 21.9 |
| | | 20 | 5.9 | 11.6 | 38.9 | 86.3 | 170.4 | 399.9 | 21.6 | 44.8 | 18.0 | 15.8 |
| | | 40 | 5.7 | 10.1 | 34.5 | 78.5 | 152.9 | 342.0 | 23.8 | 45.7 | 17.9 | 12.6 |
| | | 60 | 5.9 | 10.1 | 31.5 | 68.8 | 131.5 | 286.0 | 25.0 | 48.9 | 16.9 | 9.2 |
| | | 80 | 6.0 | 9.9 | 30.8 | 67.6 | 128.9 | 280.2 | 25.5 | 49.1 | 16.6 | 8.9 |
| | | 100 | 6.0 | 9.7 | 29.1 | 62.4 | 118.0 | 252.8 | 26.5 | 50.7 | 15.7 | 7.1 |

It can be seen from the PSD values that the single disc refiner is very efficient in reducing the coarse particles of the microfibrillated cellulose and calcium carbonate composition.

2. 50 wt. % POP Calcium Carbonate (IC60)/Botnia Pulp Microfribrillated Cellulose and Calcium Carbonate (1:1 wt. Ratio) Dried in an Atritor Dryer (51.4 wt. % Solids).

This 51.4 wt. % 1:1 wt. ratio of microfibrillated cellulose and calcium carbonate product dried utilizing an Atritor dryer was re-dispersed within the pulper at 7 wt. % solids. This material's low viscosity enabled it to pump easily. This material was then passed through the refiner and samples were taken at various work inputs.

Table 6 below shows the effect of the single disc refiner on the properties of the 51.4 wt. % microfibrillated cellulose and calcium carbonate composition. The values quoted for the as rec'd material have been subjected to 1 minute of mixing with a Silverson mixer which equates to 1000-2000 kWh/t.

TABLE 6

Properties of the single disc refmined 51.4 wt. % composition comprising microfibrillated cellulose and calcium carbonate (1:1 wt. ratio) dried in an Atritior dryer.

| Feed Bag | Feed Bag total | Refiner solids | Energy kWh/T | Total solids | POP wt. % | FLT Index Nm/g | gsm | Viscosity mPas | Total Nib Surface |
|---|---|---|---|---|---|---|---|---|---|
| Atritor product bag | 50.8 | 7 | as rec'd | 51.4 | 50.6 | [8.1] | [226] | [1340] | [2] |
| 6 50 POP | | | 0 | 6.9 | 50.5 | 5.6 | 198 | 660 | — |
| IC60/Botnia | | | 20 | 6.5 | 49.7 | 8.0 | 234 | 1480 | 3 |
| | | | 40 | 6.5 | 49.9 | 9.3 | 228 | 1540 | 2 |
| | | | 60 | 6.7 | 49.9 | 9.9 | 220 | 1480 | 1 |
| | | | 80 | 6.3 | 49.9 | 11.3 | 228 | 1680 | 0 |
| | | | 100 | 6.9 | 50.2 | 10.7 | 218 | 1420 | 0 |

This 51.4 wt. % dried composition dried in the Atritor dryer can be totally re-dispersed using 60 kWh/t and the properties improve even further with increased energy input. This material regains viscosity and FLT Index as well as having a relatively low nib count similar to the belt pressed cake.

Table 7 shows the effect the single disc refiner has had upon the particle size of the composition comprising microfibrillated cellulose and calcium carbonate (1:1 wt. ratio).

TABLE 7

PSD properties of the single disc refined 51.4 wt. % composition comprising microfibrillated cellulose and calcium carbonate (1:1 wt. ratio) dried in the Atritor dryer.

| Trial ID | Refiner solids wt. % | Energy kWh/T | Total solids wt. % | Malvern Insitec | | | | | Fractionation | | | |
|---|---|---|---|---|---|---|---|---|---|---|---|---|
| | | | | D10 | D30 | D50 | D70 | D90 | −25 um | +25-150 um | +150-300 um | +300 um |
| Atritor product bag | 7 | as rec'd | 51.4 | 10.0 | 37.9 | 90.1 | 184.3 | 416.6 | 22.8 | 41.5 | 18.6 | 17.2 |
| 6 50 POP | | 0 | 6.9 | 8.6 | 32.2 | 80.4 | 165.5 | 368.4 | 25.4 | 41.8 | 18.2 | 14.6 |
| IC60/Botnia | | 20 | 6.5 | 10.6 | 35.6 | 83.0 | 170.6 | 397.3 | 23.2 | 43.3 | 17.7 | 15.9 |
| | | 40 | 6.5 | 10.1 | 32.1 | 72.7 | 144.6 | 329.2 | 24.7 | 46.3 | 17.1 | 11.9 |
| | | 60 | 6.7 | 9.1 | 28.3 | 62.8 | 122.6 | 271.9 | 27.2 | 48.5 | 16.0 | 8.3 |
| | | 80 | 6.3 | 9.0 | 26.7 | 57.4 | 110.3 | 242.1 | 28.4 | 50.6 | 14.6 | 6.5 |
| | | 100 | 6.9 | 8.3 | 24.2 | 50.7 | 97.8 | 214.3 | 30.8 | 51.2 | 13.1 | 4.8 |

It can be seen from the PSD values that the single disc refiner is very efficient in reducing the coarse particles of the microfibrillated cellulose and calcium carbonate 1:1 wt. ratio composition.

3. 50 wt. % POP Calcium Carbonate (IC60)/Botnia Pulp Microfibrillated Cellulose and Calcium Carbonate 1:1 wt. Ratio Composition Dried in an Atritor Dryer (58.1 wt. % Solids).

This 58.1 wt. % solids composition comprising microfibrillated cellulose and calcium carbonate (1:1 wt. ratio) was evaluated at 7, 8 and 9 wt % solids. The reason for this was that the higher energy inputs could not be achieved because the composition comprising microfibrillated cellulose and calcium carbonate became too "thin" in consistency and the metal disc of the refiner was rubbing on itself. Table 9 below shows the properties of all the products at the three different solids contents. The values quoted for the as rec'd material and 0 kWh/t have been subjected to 1 minute of mixing in a Silverson mixer, which equates to 1000-2000 kWh/t.

TABLE 9

Properties of the single disc refined 58.1 wt. % Atritor product

| Feed Bag | Feed Bag total | Refiner solids | Energy kWh/T | Total solids | POP wt. % | FLT Index Nm/g | gsm | Viscosity mPas | Total Nib Surface |
|---|---|---|---|---|---|---|---|---|---|
| Atritor product bag 3 50 POP IC60/Botnia | 57.9 | 7 | as rec'd | 58.1 | 47.6 | [7.1] | [223] | [940] | [2] |
| | | | 0 | 6.0 | 47.1 | [5.9] | [209] | [640] | — |
| | | | 20 | 6.4 | 47.0 | 3.9 | 223 | 540 | — |
| | | | 40 | 7.1 | 46.9 | 6.7 | 224 | 940 | — |
| | | | 60 | 6.8 | 47.0 | 8.4 | 225 | 1140 | 2 |
| | 57.9 | 8 | 0 | 7.7 | 47.0 | [5.8] | [199] | [560] | — |
| | | | 20 | 7.9 | 46.9 | 4.7 | 223 | 640 | — |
| | | | 40 | 8.0 | 46.9 | 7.3 | 224 | 960 | — |
| | | | 60 | 7.8 | 47.1 | 8.8 | 222 | 1120 | 1 |
| | | | 80 | 8.6 | 47.0 | 9.1 | 214 | 1040 | 1 |
| | 57.9 | 9 | 0 | 8.0 | 47.2 | [6.0] | [211] | [680] | — |
| | | | 20 | 7.1 | 47.0 | 4.7 | 216 | 640 | — |
| | | | 40 | 7.8 | 47.0 | 8.4 | 225 | 1080 | 2 |
| | | | 60 | 8.4 | 47.2 | 8.6 | 220 | 1120 | 1 |
| | | | 80 | 8.5 | 47.0 | 9.6 | 222 | 1160 | 1 |
| | | | 100 | 9.1 | 47.0 | 9.9 | 215 | 1160 | 1 |

The 58.1 wt. % composition comprising microfibrillated cellulose and calcium carbonate (1:1 wt. ratio) can be totally re-dispersed at 7, 8 and 9 wt. % solids. At each consistency the control FLT has been exceeded as well as the viscosity and nib count. At 9 wt. % solids the greatest enhancement is achieved.

Table 10 shows the effect the single disc refiner has had upon the particle size of the composition comprising microfibrillated cellulose and calcium carbonate (1:1 wt. ratio) at all three solids content levels.

Once again the PSD data show the efficiency of the single disc refiner on altering size of the coarse pulp at all three consistencies.

TABLE 10

PSD properties of the Single Disc Refined 58.1 wt. % of microfibrillated cellulose (1:1 wt. ratio) composition dried in an Atritor dryer.

| Trial ID | Refiner solids wt. % | Energy kWh/T | Total solids wt. % | Malvern Insitec | | | | | Fractionation | | | |
|---|---|---|---|---|---|---|---|---|---|---|---|---|
| | | | | D10 | D30 | D50 | D70 | D90 | −25 um | +25-150 um | +150-300 um | +300 um |
| Atritor product bag 3 50 POP IC60/Botnia | 7 | as rec'd | 58.1 | 9.9 | 32.4 | 77.2 | 155.3 | 341.6 | 24.8 | 44.2 | 18.3 | 12.7 |
| | | 0 | 6.0 | 9.2 | 28.1 | 67.1 | 137.5 | 302.0 | 27.4 | 45.1 | 17.4 | 10.1 |
| | | 20 | 6.4 | 9.7 | 31.3 | 76.6 | 166.5 | 397.9 | 25.4 | 41.8 | 17.1 | 15.7 |
| | | 40 | 7.1 | 9.1 | 26.7 | 59.8 | 121.9 | 275.6 | 28.4 | 47.3 | 15.7 | 8.6 |
| | | 60 | 6.8 | 8.5 | 24.5 | 52.3 | 103.3 | 224.1 | 30.5 | 50.1 | 14.0 | 5.4 |
| | 8 | 0 | 7.7 | 9.2 | 29.6 | 71.4 | 146.1 | 322.6 | 26.5 | 44.2 | 17.7 | 12.1 |
| | | 20 | 7.9 | 9.4 | 28.7 | 67.6 | 146.3 | 363.7 | 26.9 | 43.7 | 15.8 | 13.6 |
| | | 40 | 8.0 | 8.5 | 24.3 | 52.1 | 104.3 | 232.5 | 30.7 | 49.3 | 14.1 | 6.0 |
| | | 60 | 7.8 | 8.1 | 23.1 | 48.4 | 95.4 | 206.0 | 32.1 | 50.7 | 12.8 | 4.4 |
| | | 80 | 8.6 | 7.5 | 21.3 | 42.9 | 83.6 | 176.7 | 34.7 | 51.7 | 10.7 | 2.8 |
| | 9 | 0 | 8.0 | 9.4 | 29.9 | 72.6 | 148.5 | 332.0 | 26.3 | 44.0 | 17.7 | 12.1 |
| | | 20 | 7.1 | 9.4 | 29.2 | 69.5 | 147.5 | 351.1 | 26.7 | 43.8 | 16.6 | 12.9 |
| | | 40 | 7.8 | 8.9 | 24.8 | 52.6 | 105.2 | 233.7 | 30.2 | 49.6 | 14.1 | 6.1 |
| | | 60 | 8.4 | 7.9 | 22.5 | 46.8 | 90.7 | 190.5 | 32.9 | 51.7 | 11.9 | 3.5 |
| | | 80 | 8.5 | 7.4 | 20.9 | 42.0 | 81.7 | 168.4 | 35.3 | 52.1 | 10.1 | 2.5 |
| | | 100 | 9.1 | 6.9 | 19.6 | 38.5 | 74.6 | 153.9 | 37.4 | 52.1 | 8.8 | 1.8 |

4. 50 wt. % POP Calcium Carbonate (IC60)/Botnia Pulp Microfibrillated Cellulose and Calcium Carbonate Composition Dried in an Atritor Dryer (70.1 wt. % Solids).

This 70.1 wt. % solids microfibrillated cellulose and calcium carbonate (1:1 wt. ratio) composition at each work input are shown in Table 11. The values quoted for the as rec'd material and 0 kWh/t have been subjected to 1 minute of mixing in a Silverson mixer, which equates to 1000-2000 kWh/t.

TABLE 11

Properties of the single disc refined 70.1 wt. % microfibrillated cellulose and calcium carbonate (1:1 wt. ratio) composition dried in an Atritor dryer.

| Feed Bag | Feed Bag total | Refiner solids | Energy kWh/T | Total solids | POP wt. % | FLT Index Nm/g | gsm | Viscosity mPas | Total Nib Surface |
|---|---|---|---|---|---|---|---|---|---|
| Atritor product bag | 70.1 | 9 | as rec'd | 69.5 | 47.3 | [4.9] | [225] | [640] | [2] |
| 2 50 POP | | | 0 | 7.6 | 47.2 | [3.5] | [193] | [340] | — |
| IC60/Botnia | | | 20 | 7.6 | 46.9 | 2.7 | 219 | 400 | — |
| | | | 40 | 9.1 | 46.9 | 5.1 | 218 | 620 | — |
| | | | 60 | 10.0 | 47.1 | 6.7 | 216 | 720 | — |
| | | | 80 | 9.7 | 47.1 | 7.3 | 219 | 760 | 1 |
| | | | 100 | 9.5 | 47.0 | 8.4 | 218 | 920 | 0 |

Once again it can be seen that the single disc refiner is much more efficient in re-dispersing the dried composition comprising microfibrillated cellulose and calcium carbonate (1:1 wt. ratio) compared to using a Silverson mixer. An energy input of 100 kWh/t re-disperses the composition comprising microfibrillated cellulose and calcium carbonate (1:1 wt. ratio) to a degree where the properties are similar to the belt pressed cake.

Table 12 shows the effect the single disc refiner has had upon the particle size of the composition comprising microfibrillated cellulose and calcium carbonate (1:1 wt. ratio) and once again the refiner is shown to be very efficient.

TABLE 12

PSD properties of the single disc refined 70.1 wt. % composition comprising microfibrillated cellulose and calcium carbonate (1:1 wt. ratio) dried in an Atritor dryer.

| Trial ID | Refiner solids wt. % | Energy kWh/T | Total solids wt. % | Malvern Insitec | | | | | Fractionation | | | |
|---|---|---|---|---|---|---|---|---|---|---|---|---|
| | | | | D10 | D30 | D50 | D70 | D90 | −25 um | +25-150 um | +150-300 um | +300 um |
| Atritor product bag | 9 | as rec'd | 69.5 | 10.8 | 38.9 | 96.7 | 200.0 | 436.5 | 22.3 | 39.6 | 19.4 | 18.8 |
| 2 50 POP | | 0 | 7.6 | 9.2 | 30.7 | 77.5 | 161.8 | 352.9 | 26.0 | 41.9 | 18.6 | 13.5 |
| IC60/Botnia | | 20 | 7.6 | 10.4 | 35.5 | 89.0 | 193.6 | 451.3 | 23.5 | 39.8 | 17.8 | 18.9 |
| | | 40 | 9.1 | 8.7 | 26.0 | 58.5 | 119.3 | 268.4 | 29.0 | 47.2 | 15.7 | 8.1 |
| | | 60 | 10.0 | 7.9 | 22.8 | 48.3 | 95.4 | 202.6 | 32.4 | 50.6 | 12.8 | 4.2 |
| | | 80 | 9.7 | 7.5 | 21.2 | 42.9 | 83.7 | 174.7 | 34.8 | 51.9 | 10.6 | 2.8 |
| | | 100 | 9.5 | 7.4 | 20.4 | 39.1 | 75.1 | 156.3 | 36.3 | 52.8 | 9.0 | 1.9 |

5. 50 wt. % POP Calcium Carbonate (IC60)/Botnia Pulp Composition Comprising Microfibrillated Cellulose and Calcium Carbonate (1:1 wt. Ratio) Dried in an Atritor Dryer (86.2 wt. % Solids).

This material at 86.2 wt. % solids composition comprising microfibrillated cellulose and calcium carbonate (1:1 wt. ratio) was deemed to be very dry so the composition was refined under the same conditions as the rest of the materials (intensity of 0.2 J/m) but also at an intensity of 0.1 J/m. 0.1 J/m is less intense so it takes longer to achieve the desired work input. See, Table 13.

The values quoted for the as received material and 0 kWh/t have been subjected to 1 minute of mixing in a Silverson mixer, which equates to 1000-2000 kWh/t.

TABLE 13

Properties of the single disc refined 86.2 wt. % composition comprising microfibrillated cellulose and calcium carbonate (1:1 wt. ratio) dried in an Atritor dryer.

| Feed Bag | Feed Bag total | Refiner solids | Energy kWh/T | Total solids | POP wt. % | FLT Index Nm/g | gsm | Viscosity mPas | Total Nib Surface |
|---|---|---|---|---|---|---|---|---|---|
| Atritor product bag | 86.2 | 9 | as rec'd | 87.5 | 46.7 | [3.6] | [221] | [480] | [2] |
| 1 50 POP | | Intensity | 0 | 4.8 | 46.6 | [4.2] | [253] | [740] | — |
| IC60/Botnia | | 0.2 | 20 | 7.3 | 46 | 2.3 | 217 | 320 | — |
| | | | 40 | 9.5 | 47.4 | 4.2 | 220 | 500 | — |
| | | | 60 | 9.4 | 46.1 | 5.7 | 218 | 640 | — |
| | | | 80 | 9.8 | 46.1 | 7.0 | 219 | 740 | 1 |
| | | | 100 | 9.4 | 46.2 | 7.9 | 221 | 880 | 1 |
| Atritor product bag | 86.2 | 9 | as rec'd | 87.5 | 46.7 | [3.6] | [221] | [480] | [2] |
| 1 50 POP | | Intensity | 0 | 6.0 | 46.5 | [2.2] | [196] | [240] | — |
| IC60/Botnia | | 0.1 | 20 | 8.7 | 45.9 | 4.3 | 219 | 480 | — |
| | | | 40 | 9.7 | 46.1 | 6.4 | 215 | 680 | — |
| | | | 60 | 9.3 | 45.9 | 7.9 | 225 | 940 | 0 |
| | | | 80 | 10.2 | 45.9 | 8.4 | 215 | 840 | 0 |

These results show that this very high solids composition comprising microfibrillated cellulose and calcium carbonate (1:1 wt. ratio) can be re-dispersed back to the same properties as the belt pressed cake using 100 kWh/t. If the intensity is changed then the properties can be restored using less energy of 80 kWh/t.

Table 14 shows the effect the single disc refiner has had upon the particle size of the composition comprising microfibrillated cellulose and calcium carbonate (1:1 wt. ratio) at both intensities.

TABLE 14

PSD properties of the single disc refined 86.2 wt. % composition comprising microfibrillated cellulose and calcium carbonate (1:1 wt. ratio) dried in an Atritor dryer.

| Trial ID | Refiner solids wt. % | Energy kWh/T | Total solids wt. % | Malvern Insitec | | | | | Fractionation | | | |
| | | | | D10 | D30 | D50 | D70 | D90 | −25 um | +25-150 um | +150-300 um | +300 um |
|---|---|---|---|---|---|---|---|---|---|---|---|---|
| Atritor product bag | 9 | as rec'd | 87.5 | 10.2 | 37.4 | 97.7 | 212.0 | 450.9 | 23.1 | 37.6 | 19.0 | 20.3 |
| 1 50 POP | Intensity | 0 | 4.8 | 11.2 | 37.3 | 95.4 | 206.1 | 442.5 | 22.7 | 38.8 | 19.0 | 19.6 |
| IC60/Botnia | 0.2 | 20 | 7.3 | 9.6 | 34.0 | 88.5 | 197.0 | 468.4 | 24.4 | 38.5 | 17.7 | 19.4 |
| | | 40 | 9.5 | 8.3 | 24.9 | 56.5 | 117.1 | 266.7 | 30.1 | 46.6 | 15.4 | 8.0 |
| | | 60 | 9.4 | 7.8 | 22.1 | 46.1 | 92.0 | 198.3 | 33.5 | 50.2 | 12.4 | 4.0 |
| | | 80 | 9.8 | 7.3 | 20.5 | 41.2 | 81.1 | 176.8 | 35.9 | 50.8 | 10.1 | 3.3 |
| | | 100 | 9.4 | 6.9 | 19.2 | 36.7 | 70.4 | 145.5 | 38.3 | 52.2 | 7.9 | 1.6 |
| Atritor product bag | 9 | as rec'd | 87.5 | 10.2 | 37.4 | 97.7 | 212.0 | 450.9 | 23.1 | 37.6 | 19.0 | 20.3 |
| 1 50 POP | Intensity | 0 | 6.0 | 9.1 | 32.6 | 88.6 | 190.8 | 394.7 | 25.3 | 38.0 | 19.7 | 17.0 |
| IC60/Botnia | 0.1 | 20 | 8.7 | 8.6 | 26.9 | 63.4 | 132.1 | 298.8 | 28.3 | 45.2 | 16.6 | 9.9 |
| | | 40 | 9.7 | 7.6 | 21.7 | 45.1 | 90.1 | 195.7 | 34.0 | 50.1 | 11.8 | 4.1 |
| | | 60 | 9.3 | 7.1 | 20.2 | 40.7 | 80.3 | 167.8 | 36.2 | 51.3 | 9.8 | 2.7 |
| | | 80 | 10.2 | 6.5 | 18.6 | 35.5 | 69.1 | 142.2 | 39.4 | 51.6 | 7.6 | 1.4 |

FIG. 1. summarises the FLT data from the above studies. The data show that the control FLT can be achieved in all the samples tested and that the control FLT can be exceeded in the intermediate solid products.

6. Further Processing of Refined Products

On a number of the products produced at pilot plant facility extra energy was put into the samples via the Silverson mixer. These experiments were to investigate whether the physical properties of the composition comprising microfibrillated cellulose and calcium carbonate (1:1 wt. ratio) would be improved with extra energy. The following table shows the findings, (Table 15).

It can be seen that the results are mixed. On some occasions there is an increase in FLT Index and on others there is not.

Results.

The results show:
- The single disc refiner at pilot plant facility is a very efficient way of re-dispersing a composition comprising microfibrillated cellulose and calcium carbonate (1:1 wt. ratio)
- A composition comprising microfibrillated cellulose and calcium carbonate (1:1 wt. ratio) dried up to 86 wt. % solids can be re-dispersed to achieve its original strength characteristics.
- An enhancement on strength can be achieved.
- The single disc refiner achieves re-dispersion using low energy inputs than other evaluated methods.
- The solids content is very important when refining and should be optimised for all samples.

TABLE 15

The effect of extra energy input

| Feed Bag | Feed Bag total solids wt. % | Refiner solids wt. % | Energy kWh/T | Total solids | POP wt. % | NO Silverson FLT Index Nm/g | 0.5 minute FLT Index Nm/g | 1 minute FLT Index Nm/g | 2 minutes FLT Index Nm/g | 3 minutes FLT Index Nm/g |
|---|---|---|---|---|---|---|---|---|---|---|
| 50 POP IC60 Beltpress cake | 30.5 | 7 | as rec'd | 30.8 | 49.2 | — | 7.5 | 8.5 | 8.8 | 9.2 |
| | | | 0 | 6.4 | 49.0 | 5.5 | — | 8.8 | — | — |
| 50 POP IC60/Botnia Beltpress cake | 30.5 | 6 | as rec'd | 30.8 | 49.2 | — | 7.5 | 8.5 | 8.8 | 9.2 |
| | | | 0 | 5.3 | 49.0 | — | — | 9.2 | — | — |
| | | | 20 | 5.9 | 49.0 | 9.7 | 10.2 | 11.2 | — | — |
| | | | 40 | 5.7 | 49.1 | 8.5 | 10.0 | 9.0 | — | — |
| | | | 60 | 5.9 | 49.0 | 10.4 | 10.6 | 11.1 | — | — |
| | | | 80 | 6.0 | 49.2 | 10.6 | 10.8 | 11.0 | — | — |
| | | | 100 | 6.0 | 49.2 | 11.3 | 11.4 | 11.1 | 11.0 | 11.3 |
| Atritor product bag 6 50 POP IC60/Botnia | 50.8 | 7 | as rec'd | 51.4 | 50.6 | — | 7.2 | 8.1 | 8.5 | 9.0 |
| | | | 0 | 6.9 | 50.5 | — | — | 5.6 | — | — |
| | | | 20 | 6.5 | 49.7 | 8.0 | — | — | — | — |
| | | | 40 | 6.5 | 49.9 | 9.3 | — | — | — | — |
| | | | 60 | 6.7 | 49.9 | 9.9 | — | — | — | — |
| | | | 80 | 6.3 | 49.9 | 11.3 | — | — | 12.2 | 11.9 |
| | | | 100 | 6.9 | 50.2 | 10.7 | — | — | — | — |
| Atritor product bag 3 50 POP IC60/Botnia | 57.9 | 7 | as rec'd | 58.1 | 47.6 | — | 5.3 | 7.1 | 7.3 | 8.4 |
| | | | 0 | 6.0 | 47.1 | — | — | 5.9 | — | — |
| | | | 20 | 6.4 | 47.0 | 3.9 | — | — | — | — |
| | | | 40 | 7.1 | 46.9 | 6.7 | — | — | — | — |
| | | | 60 | 6.8 | 47.0 | 8.4 | — | — | — | — |
| | 57.9 | 8 | 0 | 7.7 | 47.0 | — | — | 5.8 | — | — |
| | | | 20 | 7.9 | 46.9 | 4.7 | — | — | — | — |
| | | | 40 | 8.0 | 46.9 | 7.3 | — | — | — | — |
| | | | 60 | 7.8 | 47.1 | 8.8 | — | — | — | — |
| | | | 80 | 8.6 | 47.0 | 9.1 | — | — | — | — |
| | 57.9 | 9 | 0 | 8.0 | 47.2 | — | 6 | — | — | — |
| | | | 20 | 7.1 | 47.0 | 4.7 | — | — | — | — |
| | | | 40 | 7.8 | 47.0 | 8.4 | — | — | — | — |
| | | | 60 | 8.4 | 47.2 | 8.6 | — | — | — | — |
| | | | 80 | 8.5 | 47.0 | 9.6 | — | — | — | — |
| | | | 100 | 9.1 | 47.0 | 9.9 | — | — | — | — |
| Atritor product bag 2 50 POP IC60/Botnia | 70.1 | 9 | as rec'd | 69.5 | 47.3 | — | 3.3 | 4.9 | 5.9 | 6.6 |
| | | | 0 | 7.6 | 47.2 | — | — | 3.5 | — | — |
| | | | 20 | 7.6 | 46.9 | 2.7 | — | — | — | — |
| | | | 40 | 9.1 | 46.9 | 5.1 | — | — | — | — |
| | | | 60 | 10.0 | 47.1 | 6.7 | — | — | — | — |
| | | | 80 | 9.7 | 47.1 | 7.3 | — | — | — | — |
| | | | 100 | 9.5 | 47.0 | 8.4 | 8.2 | 8.4 | 8.7 | 8.7 |
| Atritor product bag 1 50 POP IC60/Botnia | 86.2 | 9 Intensity 0.2 | as rec'd | 87.5 | 46.7 | — | 2.2 | 3.6 | 4.6 | 5 |
| | | | 0 | 4.8 | 46.6 | — | — | 4.2 | — | — |
| | | | 20 | 7.3 | 46 | 2.3 | 4.6 | 5.6 | — | — |
| | | | 40 | 9.5 | 47.4 | 4.2 | 5.5 | 6.3 | — | — |
| | | | 60 | 9.4 | 46.1 | 5.7 | 6.9 | 7.2 | — | — |
| | | | 80 | 9.8 | 46.1 | 7.0 | 7.7 | 8.3 | — | — |
| | | | 100 | 9.4 | 46.2 | 7.9 | 8.7 | 9 | — | — |
| Atritor product bag 1 50 POP IC60/Botnia | 86.2 | 9 Intensity 0.1 | as rec'd | 87.5 | 46.7 | — | 2.2 | 3.6 | | |
| | | | 0 | 6.0 | 46.5 | — | — | 2.2 | — | — |
| | | | 20 | 8.7 | 45.9 | 4.3 | 5.8 | 6.3 | — | — |
| | | | 40 | 9.7 | 46.1 | 6.4 | 7.0 | 7.4 | — | — |
| | | | 60 | 9.3 | 45.9 | 7.9 | 9.0 | 8.9 | — | — |
| | | | 80 | 10.2 | 45.9 | 8.4 | 8.7 | 8.8 | 8.4 | 8.2 |

Lowering the intensity of the refiner achieves improved results.

The single disc refiner is very efficient in altering the PSD of a composition comprising microfibrillated cellulose and calcium carbonate (1:1 wt. ratio).

The invention claimed is:

1. A method of improving the physical and/or mechanical properties of redispersed dried or partially dried microfibrillated cellulose, the method comprising:
   (a) providing an aqueous composition of microfibrillated cellulose, wherein the microfibrillated cellulose is obtained from a recycled pulp, or a papermill broke, or a papermill waste stream, or waste from a papermill;
   (b) dewatering the aqueous composition by one or more of:
      i. dewatering by belt press,
      ii. a high pressure automated belt press,
      iii. centrifuge,
      iv. tube press,
      v. screw press, and
      vi. rotary press
   to produce a dewatered microfibrillated cellulose composition;
   (c) drying the dewatered microfibrillated cellulose composition by one or more of:
      i. a fluidized bed dryer,
      ii. microwave and/or radio frequency dryer,
      iii. a hot air swept mill or dryer, a cell mill or a multirotor cell mill, and
      iv. freeze drying
   to produce a dried or partially dried microfibrillated cellulose composition; and
   (d) re-dispersing the dried or at least partially dried microfibrillated cellulose in a liquid medium; wherein the microfibrillated cellulose has a tensile index and/or viscosity which is at least 50% of the tensile index and/or viscosity of the aqueous composition of microfibrillated cellulose prior to drying at a comparable concentration and a fibre steepness of from 20 to 50.

2. The method of claim 1, wherein the aqueous composition of microfibrillated cellulose additionally comprises an inorganic particulate material.

3. The method of claim 2, wherein the inorganic particulate material comprises a platy mineral, kaolin and/or talc.

4. The method of claim 2, wherein the inorganic particulate material additionally comprises inorganic particulate material other than a platy mineral.

5. The method of claim 2, wherein the inorganic particulate material is calcium carbonate.

6. The method of claim 2, the wherein inorganic particulate material is added at one or more of the following stages: (i) prior to or during manufacture of the aqueous composition comprising microfibrillated cellulose; (ii) following manufacture of the aqueous composition comprising microfibrillated cellulose; (iii) during dewatering of the aqueous composition of microfibrillated cellulose; (iv) during drying of the aqueous composition of microfibrillated cellulose; (v) prior to re-dispersing of the dried or at least partially dried microfibrillated cellulose; and (vi) during re-dispersing of the dried or at least partially dried microfibrillated cellulose.

7. The method of claim 2, wherein the aqueous composition of the dewatered microfibrillated cellulose prior to drying or at least partially drying has a solids content of up to 20 wt.

8. The method of claim 2, wherein the aqueous composition of the dewatered microfibrillated cellulose prior to drying or at least partially drying has a solids content of up to 20 wt., ad further wherein up to 80% of the solids is inorganic particulate material.

9. The method of claim 2, wherein the liquid medium is aqueous or non-aqueous.

10. The method of claim 9, wherein the liquid medium is water.

11. The method of claim 2, wherein the re-dispersing of the dried or at least partially dried microfibrillated cellulose comprises using a refiner.

12. The method of claim 2, wherein the re-dispersing of the dried or at least partially dried microfibrillated cellulose comprises using a hot air swept mill or dryer.

13. The method of claim 2, wherein the re-dispersing of the dried or at least partially dried microfibrillated cellulose comprises using a cell mill or a multirotor cell mill.

14. The method of claim 2, wherein said a dried or partially dried microfibrillated cellulose composition has a fibre steepness from 20 to 50.

15. The method of claim 1, wherein said dried or partially dried microfibrillated cellulose is re-dispersed in the presence of one or more additives selected from the group consisting of one or more salts, one or more sugars, one or more glycols, urea, carboxymethyl cellulose and guar gum.

16. The method of claim 15, wherein the one or more sugars is selected from the group consisting of one or more of monosaccharides, disaccharides, oligosaccharides and polysaccharides.

17. The method of claim 15, wherein the one or more salts comprise or is sodium chloride.

18. The method of claim 15, wherein the one or more glycols comprise or is ethylene glycol.

19. The method of claim 1, wherein the aqueous composition of the dewatered microfibrillated cellulose prior to drying or at least partially drying has a solids content of up to 50 wt. %.

20. The method of claim 1, wherein the aqueous composition of the dewatered microfibrillated cellulose prior to drying or at least partially drying has a solids content of up to 30 wt. %.

21. The method of claim 1, wherein the aqueous composition of the dewatered microfibrillated cellulose prior to drying or at least partially drying has a solids content of up to 20 wt. %.

22. The method of claim 1, wherein the liquid medium is aqueous or non-aqueous.

23. The method of claim 22, wherein the liquid medium is water.

24. The method of claim 1, wherein the re-dispersing of the dried or at least partially dried microfibrillated cellulose comprises using a refiner.

25. The method of claim 1, wherein the re-dispersing of the dried or at least partially dried microfibrillated cellulose comprises using a hot air swept mill or dryer.

26. The method of claim 1, wherein the re-dispersing of the dried or at least partially dried microfibrillated cellulose comprises using a cell mill or a multirotor cell mill.

27. The method of claim 1, wherein said a dried or partially dried microfibrillated cellulose composition has a fibre steepness from 20 to about 50.

* * * * *